(12) United States Patent
Ginis et al.

(10) Patent No.: US 12,481,101 B2
(45) Date of Patent: Nov. 25, 2025

(54) CASCADED-MODE RESONATORS

(71) Applicant: PRESIDENT AND FELLOWS OF HARVARD COLLEGE, Cambridge, MA (US)

(72) Inventors: Vincent Ginis, Cambridge, MA (US); Ileana-Cristina Benea-Chelmus, Cambridge, MA (US); Jinsheng Lu, Cambridge, MA (US); Marco Piccardo, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 374 days.

(21) Appl. No.: 18/110,305

(22) Filed: Feb. 15, 2023

(65) Prior Publication Data

US 2023/0258867 A1    Aug. 17, 2023

Related U.S. Application Data

(60) Provisional application No. 63/310,992, filed on Feb. 16, 2022.

(51) Int. Cl.
G02B 6/14    (2006.01)
G02B 6/12    (2006.01)

(52) U.S. Cl.
CPC ...... G02B 6/14 (2013.01); *G02B 2006/12107* (2013.01)

(58) Field of Classification Search
CPC .................. G02B 6/14; G02B 2006/12107
USPC .......................................................... 385/15
See application file for complete search history.

(56) References Cited

U.S. PATENT DOCUMENTS

2003/0048986 A1* 3/2003 Huang ................ H04J 14/04
  385/24
2016/0341916 A1* 11/2016 Meir .................... G02B 6/3885

* cited by examiner

*Primary Examiner* — Jerry M Blevins
(74) *Attorney, Agent, or Firm* — FOLEY & LARDNER LLP

(57) ABSTRACT

A device includes a first mode converter and a second mode converter that define a region between the first mode converter and the second mode converter. The region can contain a plurality of orthogonal modes of a wave. The wave, when sent from outside the region and when propagating from the first mode converter towards the second mode converter, can include a first mode of the plurality of orthogonal modes. The second mode converter can convert the wave from the first mode of the plurality of orthogonal modes, to a second mode of the plurality of orthogonal modes that is different from the first mode. The first mode converter can convert the wave to the first mode of the plurality of orthogonal modes.

20 Claims, 38 Drawing Sheets

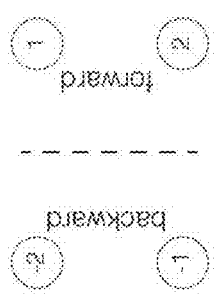
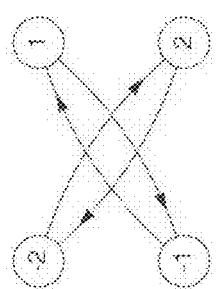
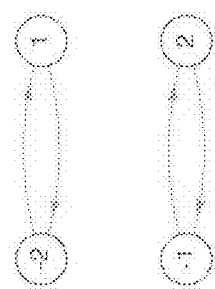
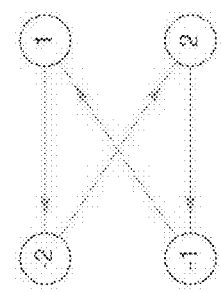
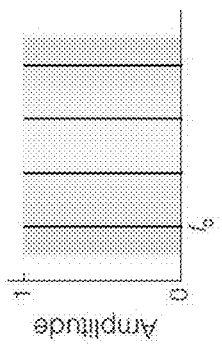
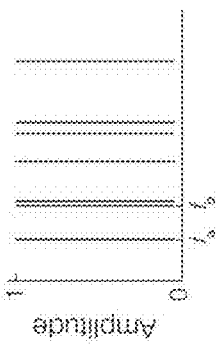
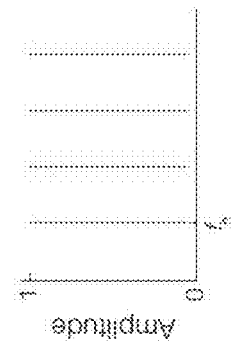
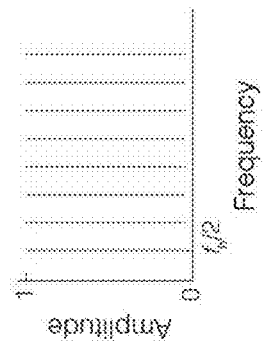
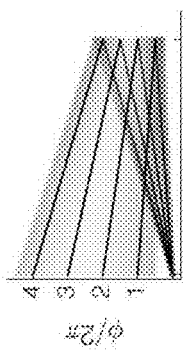
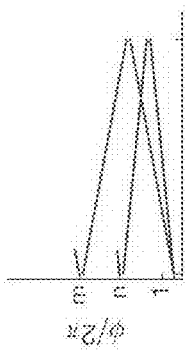
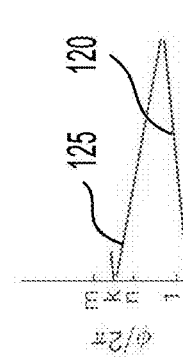
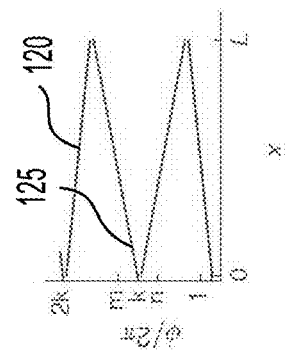
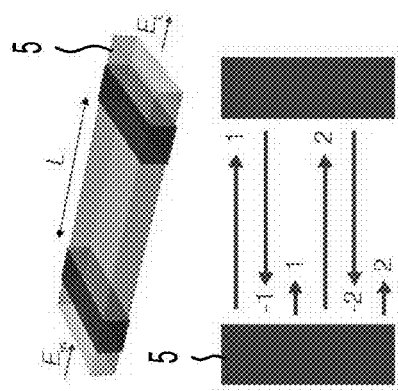
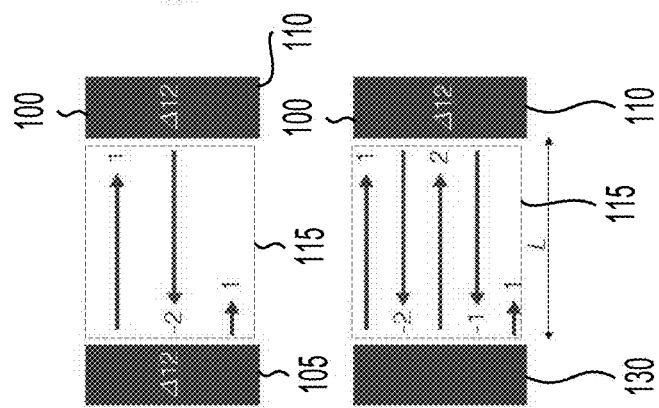
FIG. 1A  FIG. 1B  FIG. 1C  FIG. 1D

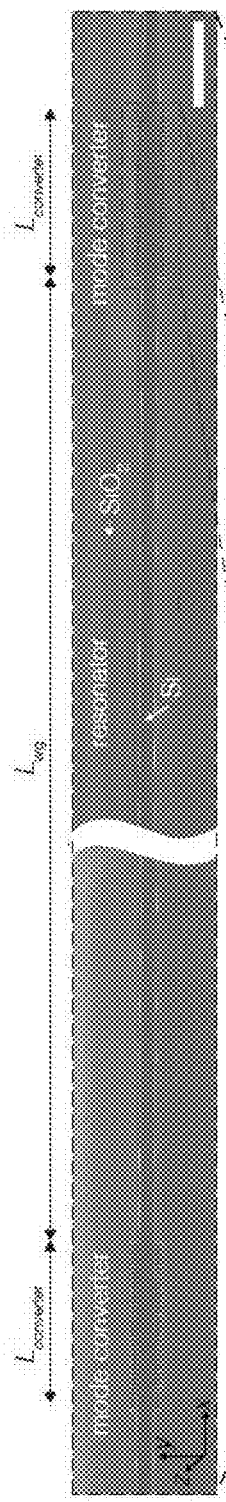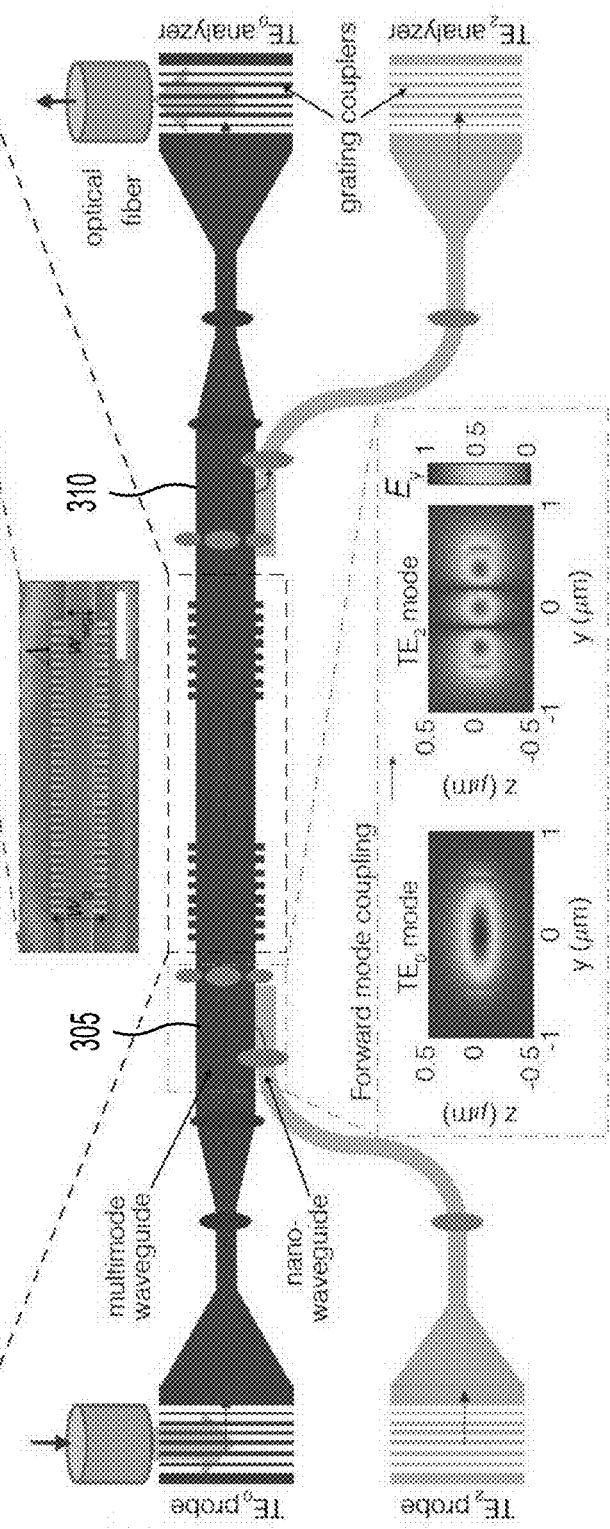
FIG. 3A
FIG. 3B

FIG. 4A
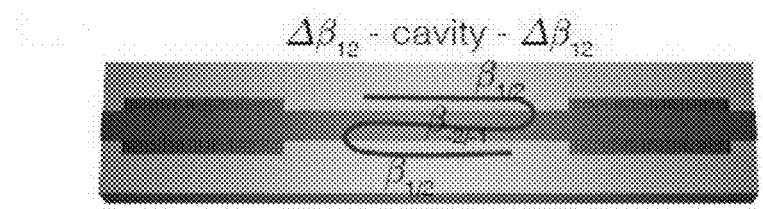
Measurements | Simulations
FIG. 4D 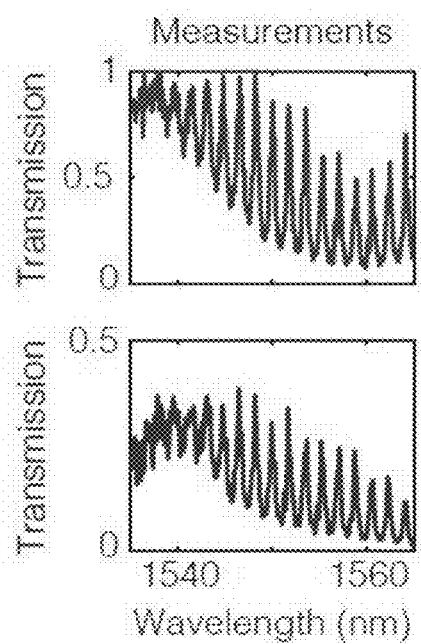 FIG. 4F
FIG. 4E 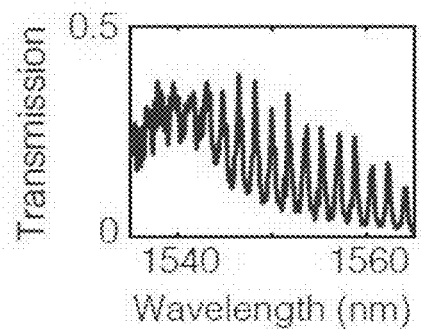 FIG. 4G
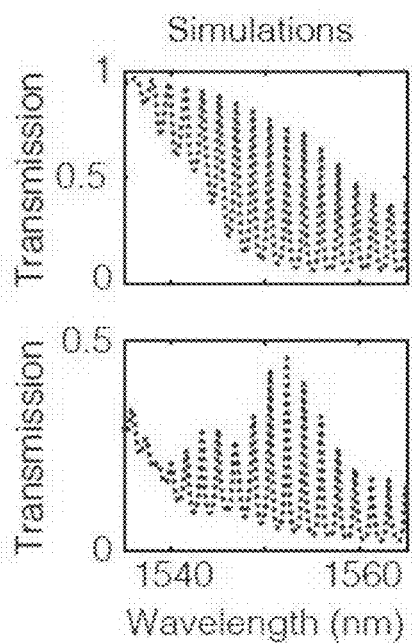
——— Input $TE_0$ - Output $TE_0$    ——— Input $TE_2$ - Output $TE_2$ FIG. 4B
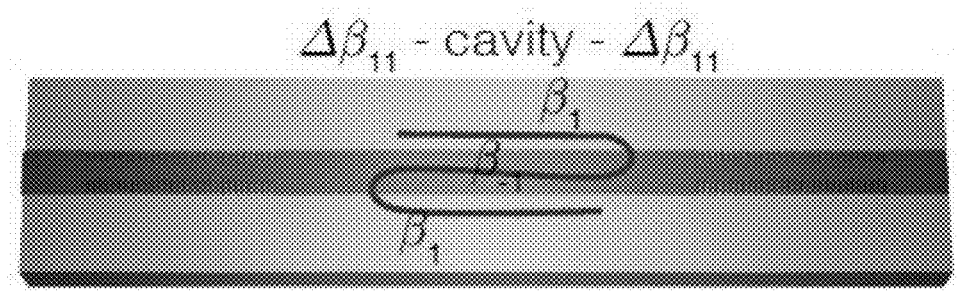
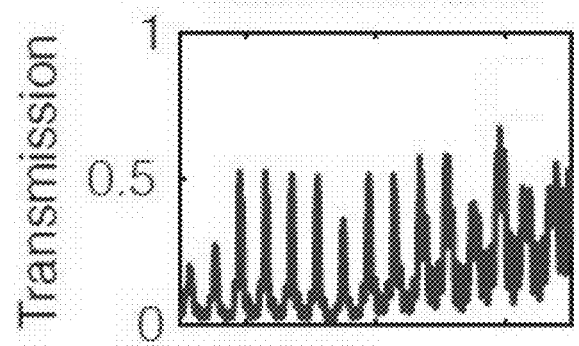
FIG. 4H
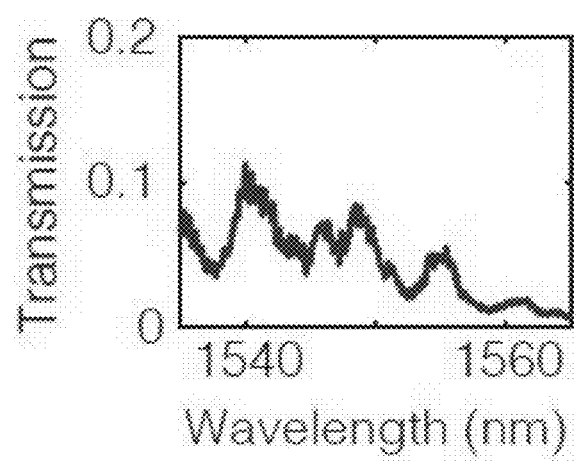
FIG. 4I FIG. 4C
$\Delta\beta_{22}$ - cavity - $\Delta\beta_{22}$
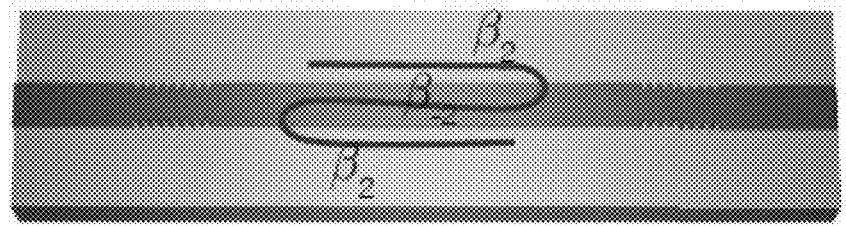
Measurements
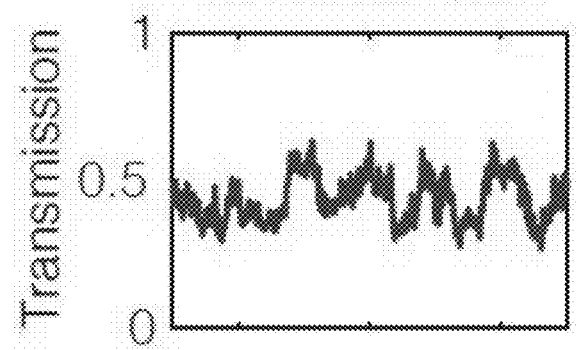
FIG. 4J
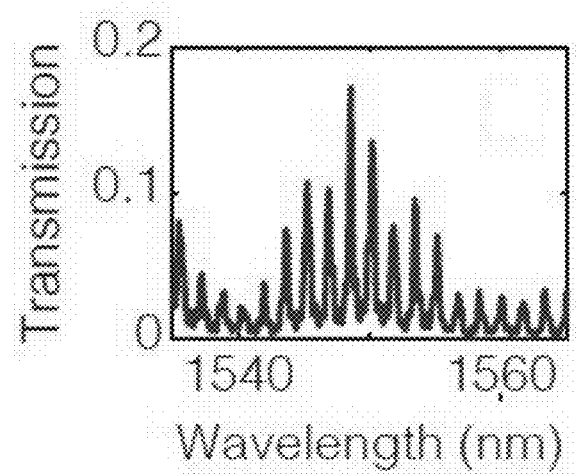
FIG. 4K
Wavelength (nm)
——— Input $TE_0$ - Output $TE_0$   ——— Input $TE_2$ - Output $TE_0$

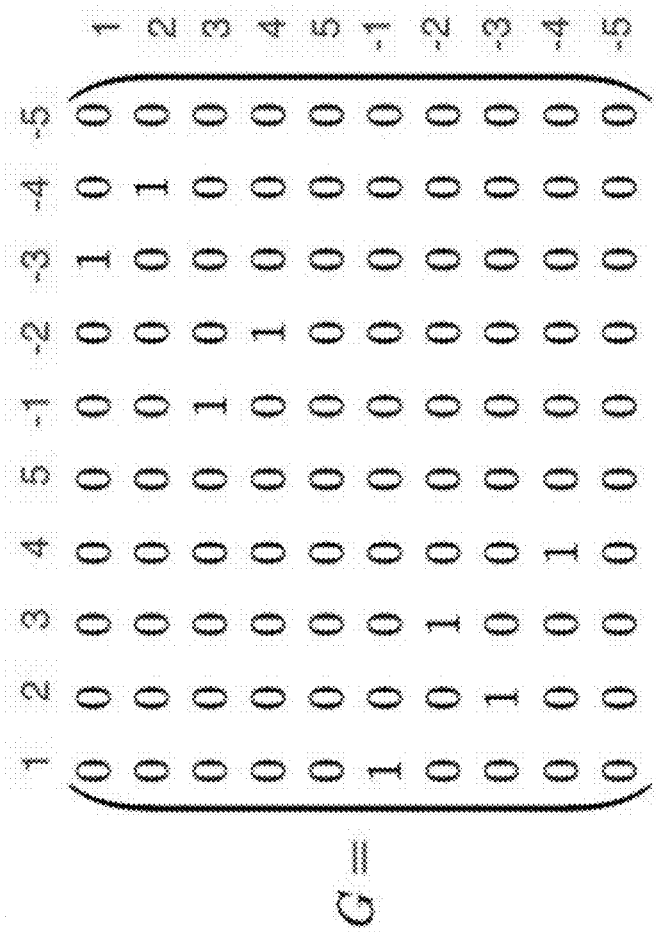
FIG. 8F
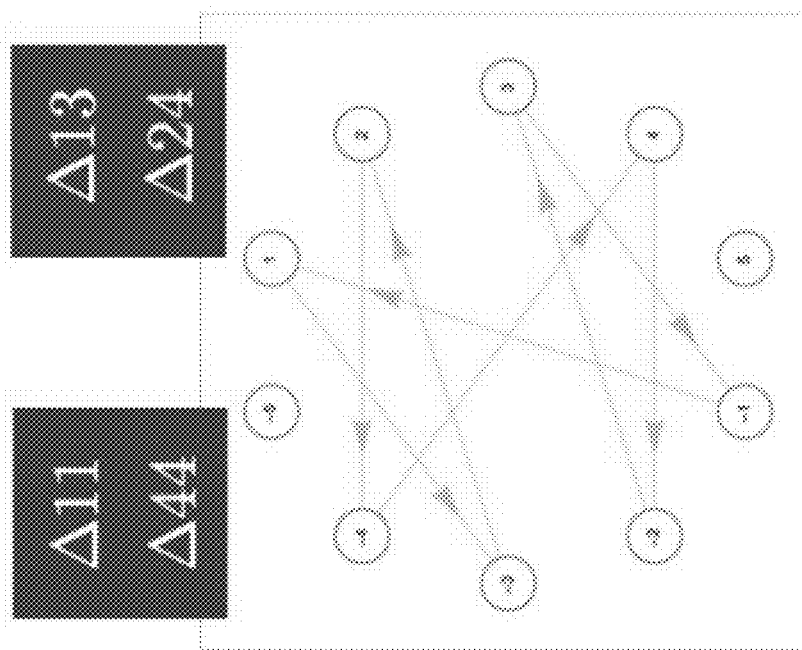
FIG. 8D
FIG. 8E

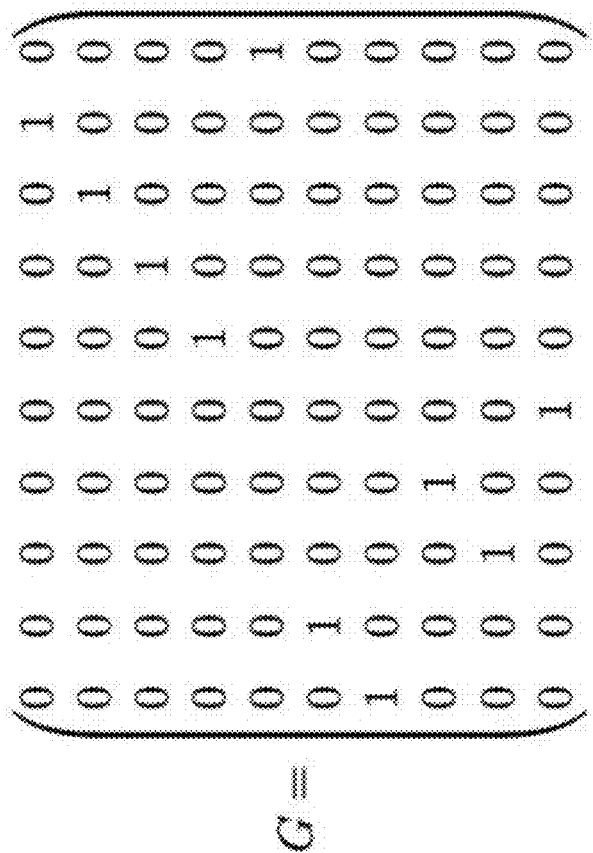
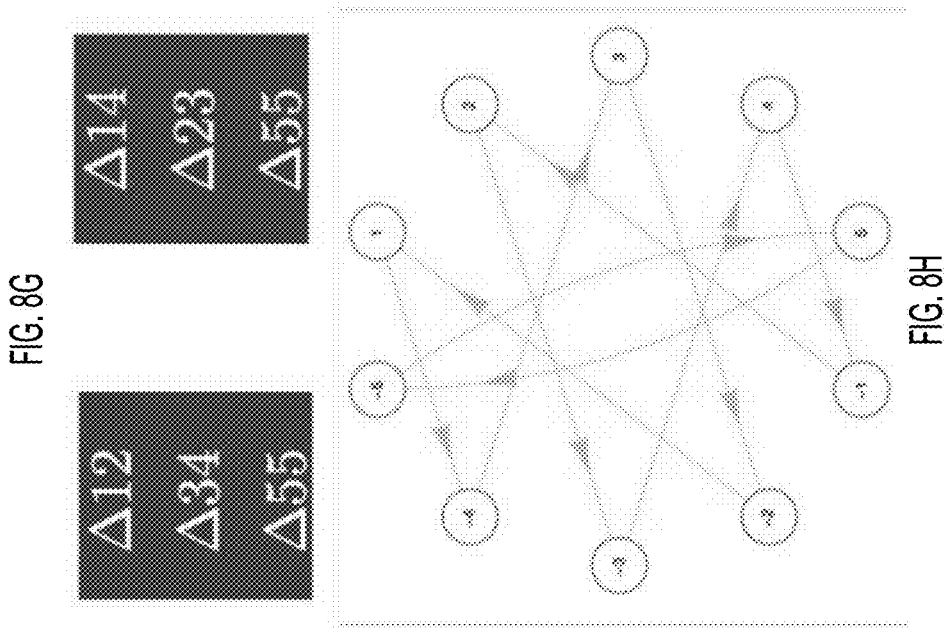
FIG. 8G  FIG. 8H  FIG. 8I

CASCADED-MODE RESONATORS

CROSS-REFERENCE TO RELATED PATENT APPLICATION

This application claims the benefit and priority of U.S. Provisional Patent Application No. 63/310,992, filed on Feb. 16, 2022, the entirety of which is incorporated by reference herein.

TECHNICAL FIELD

The present application relates generally to resonators.

BACKGROUND

Optical resonators can be used in modern physics and technology.

SUMMARY

Optical resonators can enable the generation, manipulation, and storage of electromagnetic waves. Optical resonators can be used in technology and fundamental research, including their application in telecommunications, lasers and non-linear optics, ultra-sensitive measurements in cavity optomechanics, and the study of light-matter interactions in the context of cavity quantum electrodynamics (QED). The physics underlying the operation of these resonators can be determined by the constructive interference of electromagnetic waves at specific frequencies, giving rise to the resonance spectrum. In some aspects, the systems and methods of the present disclosure are directed to a class of optical resonators where resonances are generated by coupling different modes in a cascaded process. The generalized round-trip phase condition can lead to resonator characteristics, such as the largest resonant wavelength, the free spectral range, the resonance linewidth, and the quality factor that are markedly different from Fabry-Perot resonators and can be tailored over a wide range. The existence of these modes can be demonstrated in an experimental realization of a resonator that includes an integrated waveguide cavity with mode converters coupling two transverse modes in one supermode. The resonance signature of the cascaded-mode resonator can include a spectrum resulting from the coherent super-position of the two transverse modes, rather than from the mere addition of their spectra. A mode-independent behavior of the resonator can be demonstrated and its engineered spectral properties can agree with theoretical predictions. The generalization of cascaded-mode resonators can be material, frequency, and geometry-independent and thus can find use in several application domains.

At least one aspect of the present disclosure is directed to a device. The device can include a first mode converter and a second mode converter that define a region between the first mode converter and the second mode converter. The region can contain a plurality of orthogonal modes of a wave. The wave, when sent from outside the region and when propagating from the first mode converter towards the second mode converter, can include a first mode of the plurality of orthogonal modes. The second mode converter can convert the wave from the first mode of the plurality of orthogonal modes, to a second mode of the plurality of orthogonal modes that is different from the first mode. The first mode converter can convert the wave to the first mode of the plurality of orthogonal modes.

Another aspect of the present disclosure is directed to a device. The device can include a mirror and a mode converter that define a region between the mirror and the mode converter. The region can contain a plurality of orthogonal modes of a wave. The wave, when propagating from the mirror towards the mode converter, can include a first mode of the plurality of orthogonal modes. The mode converter can convert the wave from the first mode of the plurality of orthogonal modes, to a second mode of the plurality of orthogonal modes that is different from the first mode. The mirror can reflect the wave with the second mode of the plurality of orthogonal modes towards the mode converter. The mode converter can convert the wave from the second mode of the plurality of orthogonal modes to the first mode of the plurality of orthogonal modes. The mirror can reflect the wave with the first mode of the plurality of orthogonal modes towards the mode converter.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIGS. 1A and 1B illustrate embodiments of (e.g., non-cascaded-mode) resonators.

FIGS. 1C and 1D illustrate an operating principle underlying cascaded mode resonances, according to an example embodiment.

FIGS. 3A and 3B illustrate schematics of cascaded-mode resonators in integrated photonics, according to an example embodiment.

FIGS. 4A-4K illustrate transmission spectroscopy of cascaded-mode resonators versus Fabry-Perot resonators, according to an example embodiment.

FIGS. 8A-8I illustrate examples of graphs and adjacency matrices related to cascaded-mode resonators, according to an example embodiment.

Like reference numbers and designations in the various drawings indicate like elements.

DETAILED DESCRIPTION

Figure 2A:
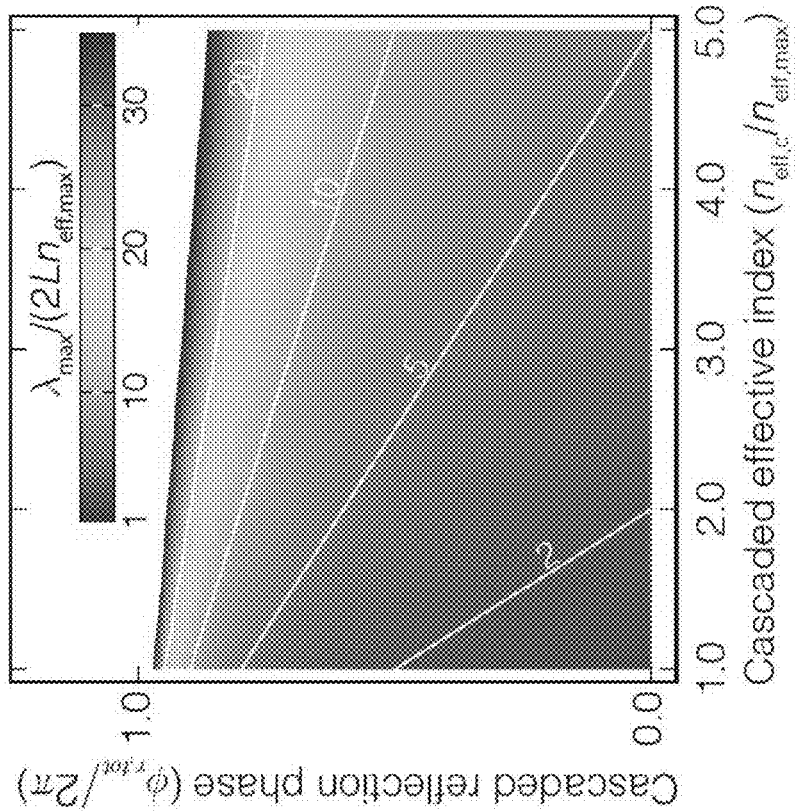
FIGS. 2A-2C illustrate spectral properties of cascaded-mode resonances, according to an example embodiment.
Figure 2A:
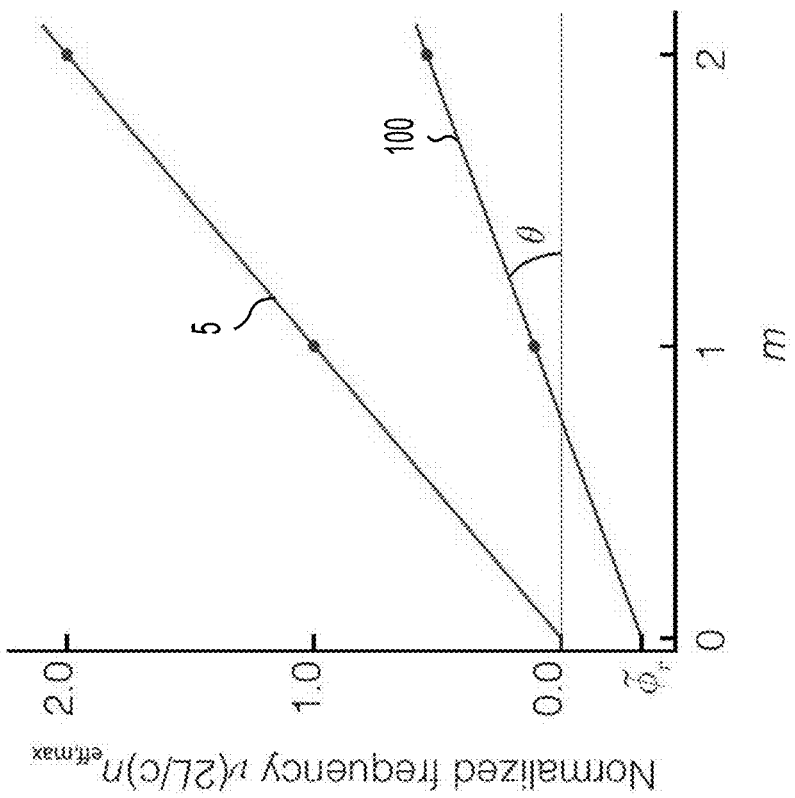

Following below are more detailed descriptions of various concepts related to, and implementations of, methods, apparatuses, and systems for cascaded-mode resonators. The various concepts introduced above and discussed in greater detail below may be implemented in any of a number of ways, as the described concepts are not limited to any particular manner of implementation. Examples of specific implementations and applications are provided primarily for illustrative purposes.

Optical resonators can be a cornerstone of modern physics and technology. These optical devices can include two functions: they can provide spectral selectivity to incident light and enhance its intensity in a small volume of space. An example of a device that exploits both the spectral selectivity and the field amplification within a resonator is the laser, in essence, an optical cavity in which an active medium and a pumping mechanism are present. In addition, resonators with an embedded crystalline nonlinearity can enable efficient frequency doubling, sum and difference frequency generation, optical parametric amplification, and optical isolation. The spectral sensitivity of resonators can be used in chemical, biological, and thermal spectroscopy, and in optical communication networks in filters, switches, and optical delay lines. An intriguing nonlinear interaction that can be amplified in-side resonators is the transfer of momentum between light and matter, a feature that can be used in cavity optomechanics to exploit the coupling between optical and mechanical degrees of freedom of resonators. Optical resonators can provide a platform to study and control quantum mechanical interactions. Several fascinating effects can arise in a lattice of coupled optical resonators, including the emergence of an effective magnetic field for photons, non-reciprocal phase shifts, and topologically protected edge states, which can be useful for unidirectional and robust guiding of light.

The properties of resonators can be designed by modifying the geometry, the medium, or the reflectors of the resonators. New cavity implementations can be realized where nanostructured mirrors are engineered to manipulate the cavity's thickness or stability, or generally, to enable tunability of the transmitted field. The systems and methods of the present disclosure relate to a type of resonator with a cascaded-mode mechanism. This mechanism can be material, frequency, and geometry-independent.

Electromagnetic resonators can occur in a variety of geometries. Apart from the one-dimensional Fabry-Perot geometry, where a resonator can be created by positioning two mirrors at a distance from each other, circular, toroidal, spherical, and other three-dimensional implementations also exist. Physically, these resonators can be understood from the constructive interference of waves, creating resonant modes. These resonances can arise because waves bounce back and forth between two mirrors, as is the case of Fabry-Perot modes, or because waves are guided in a circular path back onto themselves, as in the case of whispering gallery modes.

A parameter in the creation of resonant modes is the round-trip phase $\Delta\phi$, accumulated by the field after completing one round trip in the resonator. This can include the sum of the propagation phase (e.g., $2\pi$ times the ratio of the round-trip distance to the wavelength in the resonator material), and the reflection phase shift $\phi_r$ experienced by the wave upon reflection at the mirrors. Waves that pick up a total round-trip phase equal to a multiple of $2\pi$ can constructively interfere with themselves and become resonant modes of the resonator, as is illustrated in FIG. 1A. FIG. 1A illustrates a (e.g., non-cascaded-mode) resonator 5. The first column shows a schematic of a resonator of length L. The second column shows the phase shift as a function of distance x for a resonator of length L for different longitudinal modes of index m: after a round trip 2L the accumulated phase is m$2\pi$. The third column shows the resonance spectrum, which corresponds to the frequencies for which the round-trip phase $\Delta\phi$ equals a multiple of $2\pi$. The fourth column shows the directed graph description of the resonator. For the directed graph, the vertices correspond to the modes and the lines between the nodes correspond to the different mode converters. The loops in these graphs identify the different resonances.

In the case of a Fabry-Perot geometry, the resonance condition can be given by Equation 1:

$$2Ln\frac{2\pi v}{c} + 2\phi_r = 2\pi m \quad (1)$$

where v is the frequency of light, m is an integer number representing the index of the resonant modes of frequency $v_m$, c is the speed of light in vacuum, L is the length of the resonator, n is the refractive index of the material inside the resonator, and $\phi_r$ is the reflection phase at the mirrors.

Equation 1 can explain two properties of resonators (1) the existence of the fundamental mode (e.g., the smallest resonant frequency or, equivalently, the largest wavelength that can be confined in a resonator), and (2) the appearance of a spectrum with only a discrete number of modes for which constructive interference is satisfied. The resulting frequency spectrum from Equation 1 can be given by $v_m = c(m-\phi_r/\pi)/(2$ nL).

In the preceding argument, the properties of the mode in the transversal plane, perpendicular to the propagation direction, can be ignored. However, most resonators can include multiple transverse modes (e.g., with different spatial profiles and polarization states). A discrete number of orthogonal transverse modes can exist for each frequency, for example, $TE_i$ and $TM_i$ waves. Each transverse mode can experience a different effective index ($n_{eff,i}$). Therefore, different round-trip phases $\Delta\phi_i$ can occur for each of these transverse modes. As a result, the resonant modes of a resonator (e.g., longitudinal modes) can include a superposition of spectra corresponding to the various families of transverse modes as shown in Equation 2:

$$v_{i,m} = \frac{c\left(m - \frac{\phi_{r,i}}{\pi}\right)}{2n_{eff,i}L} \quad (2)$$

The different spectra can be visualized in FIG. 1B. FIG. 1B illustrates a resonator 5. In many resonators, different transverse modes can contribute to different spectra because their effective refractive indices inside the resonator differ. The different effective indices determine the different slopes of the lines in the second column, which results in spectra with different fundamental modes ($f_a$, $f_b$) and mode spacings in the third column. The fourth column shows the directed graph description of the resonator. For the directed graph, the vertices correspond to the modes and the lines between the nodes correspond to the different mode converters. The loops in these graphs identify the different resonances.

The systems and methods of the present disclosure include a resonator in which the different transverse modes do not independently form resonances, but where supermodes are created. The supermodes can include a well-defined superposition of transverse modes generated by a cascaded transverse mode coupling mechanism. The resonator can include efficient and selective mode converters that reflect a particular incident transverse mode into another.

This principle can be illustrated in FIG. 1C. Upon reflection on the rightmost mirror, an incident wave with a particular transverse mode profile can be converted into another transverse mode. When this mode returns to the leftmost mirror, another mode conversion can occur upon reflection. This cascade of mode conversions can be repeated as many times as the number of transverse modes supported by the waveguide, leading in steady state to a "supermode" formed by the superposition of the different modes. The supermode can lead to resonances for frequencies satisfying a round-trip phase condition, representing a generalization of Equation 1. Two implementations of this concept can be shown in FIGS. 1C and 1D, where two transverse modes are coupled together by mode conversion into one supermode.

FIG. 1C illustrates a cascaded-mode resonator 100 (e.g., device, optical cavity, optical resonator, etc.) where, in one round trip, each mode propagates only once, in a single direction. In FIG. 1C, the round-trip phase $\Delta\phi = k_0 L(n_{eff,1} + n_{eff,2}) + 2\phi_{12}$, where $k_0$ is the free-space wave vector and $\phi_{12}$ is the reflection phase of the mode-conversion between mode 1 and mode 2. This implementation can be generalized to resonators with N different transverse modes, each experiencing an effective index $n_{eff,i}$. FIG. 1C illustrates the cascaded-mode resonator 100 in which the two transverse modes, labeled 1 and 2, can couple into one supermode, with fundamental frequency $f_h$. The round-trip phase can be partly determined by the effective indices of mode 1 (e.g., first mode 120) and of mode 2 (e.g., second mode 125). The labels in the resonators in the first column refer to the mode conversions that take place in the blue regions: Δ12 implies that mode 1 is reflected into mode 2, and vice versa. The fourth column shows the directed graph description of the resonator. For the directed graph, the vertices correspond to the modes and the lines between the nodes correspond to the different mode converters. The loops in these graphs identify the different resonances.

The cascaded-mode resonator 100 can include a first mode converter 105 (e.g., Bragg reflector). The first mode converter 105 can include a first Bragg reflector. The cascaded-mode resonator 100 can include a second mode converter 110. The second mode converter 110 can include a second Bragg reflector. The cascaded-mode resonator 100 can include two mode converters. The cascaded-mode resonator 100 can include at least two mode converters. The first mode converter 105 and the second mode converter 110 can be arranged in a linear geometry. For example, the first mode converter 105 and the second mode converter 110 can be inline along a direction of propagation of waves between the first mode converter 105 and the second mode converter 110. The first mode converter 105 and the second mode converter 110 can be inline along an axis of propagation of waves between the first mode converter 105 and the second mode converter 110.

The first mode converter 105 and the second mode converter 110 can define a region 115 between the first mode converter 105 and the second mode converter 110. The region 115 can contain a plurality of orthogonal modes (e.g., transverse modes) of a wave. The plurality of orthogonal modes can be defined by at least one of a polarization, a frequency, an amplitude, or a phase profile. The plurality of orthogonal modes contained in the region 115 can define (e.g., occur in) an optical path of the wave. For instance, a sequence of mode conversions can define (e.g., occur in, outline, map, and/or describe a series/sequence/order/chain of transitions/conversions between orthogonal modes at specific transition points in) the optical path of the wave. The sequence of mode conversions that gives rise to the plurality of modes can define the optical path of the wave. The sequence of mode conversions of the plurality of orthogonal modes contained in the region 115 can define an optical path length of the wave (e.g., by defining the optical path). A sequence of mode conversions can define the optical path length of the wave. The sequence of mode conversions that give rise to the plurality of modes can define the optical path length of the wave. The optical path length can be a parameter that defines one or more properties of the cascaded-mode resonator 100. Manipulating the optical path and/or the optical path length can allow for the manipulation of second order parameters (e.g., resonance lines, largest possible frequency contained in the resonator, etc.).

The wave, when sent from outside the region 115 and when propagating from the first mode converter 105 towards the second mode converter 110, can include a first mode 120 of the plurality of orthogonal modes. The first mode 120 of the plurality of orthogonal modes can be contained in the region 115. The region 115 can contain a plurality of orthogonal modes of a plurality of waves.

The second mode converter 110 can convert the wave from the first mode 120 of the plurality of orthogonal modes, to a second mode 125 of the plurality of orthogonal modes that is different from the first mode 120. The first mode 120 can be different from the second mode 125. For example, the polarization of the first mode 120 can be different from the polarization of the second mode 125. The frequency of the first mode 120 can be different from the frequency of the second mode 125. The amplitude of the first mode 120 can be different from the amplitude of the second mode 125. The phase profile of the first mode 120 can be different from the phase profile of the second mode 125. The second mode 125 of the plurality of orthogonal modes can be contained in the region 115.

The first mode converter 105 can convert the wave to the first mode 120 of the plurality of orthogonal modes. For example, the first mode converter 105 can convert the wave to the initial mode of the plurality of orthogonal modes. The first mode converter 105 convert the wave from an $N^{th}$ mode of the plurality of orthogonal modes, to the first mode 120 of the plurality of orthogonal modes, where N is an integer value that is equal to or larger than 2. The $N^{th}$ mode can include an intermediate mode.

In some embodiments, the first mode 120 of the plurality of orthogonal modes can include a first propagation constant (e.g., $\beta_1$). The second mode 125 of the plurality of orthogonal modes can include a second propagation constant (e.g., $\beta_2$). The second propagation constant can be different from the first propagation constant. The first propagation constant can determine how the amplitude and phase of light with a given frequency varies along a propagation direction. The first propagation constant can depend on the optical frequency of light. The second propagation constant can determine how the amplitude and phase of light with a given frequency varies along a propagation direction. The second propagation constant can depend on the optical frequency of light.

FIG. 1D illustrates the cascaded-mode resonator 100 where each mode propagates in both directions in the cascade. The arrangement of mode conversions, shown in FIG. 1D, can yield a round-trip phase of $\Delta\phi=2k_0L(n_{eff,1}+n_{eff,2})+2\phi_{12}+\phi_{11}+\phi_{22}$. This implementation can be generalized to resonators with N different transverse modes, each experiencing an effective index $n_{eff,i}$. FIG. 1D illustrates a cascaded-mode resonator in which a supermode is created where both mode 1 (e.g., first mode 120) and mode 2 (e.g., second mode 125) circulate twice through the resonator before completing the round trip. There can be one spectrum, with fundamental mode and free spectral range halved compared to FIG. 1C. The cascaded-mode resonator 100 can include a mirror where each mode is reflected into itself. The fourth column shows the directed graph description of the resonator. For the directed graph, the vertices correspond to the modes and the lines between the nodes correspond to the different mode converters. The loops in these graphs identify the different resonances.

The cascaded-mode resonator 100 can include a mirror 130. The cascaded-mode resonator 100 can include a mode converter (e.g., first mode converter 105, second mode converter 110, Bragg reflector). The cascaded-mode resonator 100 can include the mirror 130 and the first mode converter 105. The mirror 130 and the first mode converter 105 can be arranged in a linear geometry. For example, the mirror 130 and the first mode converter 105 can be inline along a direction of propagation of waves between the mirror 130 and the first mode converter 105. The mirror 130 and the first mode converter 105 can be inline along an axis of propagation of waves between the mirror 130 and the first mode converter 105. The mirror 130 and the first mode converter 105 can be arranged in a ring geometry. For example, the mirror 130 and the first mode converter 105 can be arranged in a loop. The direction of propagation of waves can form a ring or a loop.

The cascaded-mode resonator 100 can include the mirror 130 and the second mode converter 110. The mirror 130 and the second mode converter 110 can be arranged in a linear geometry. For example, the mirror 130 and the second mode converter 110 can be inline along a direction of propagation of waves between the mirror 130 and the second mode converter 110. The mirror 130 and the second mode converter 110 can be inline along an axis of propagation of waves between the mirror 130 and the second mode converter 110. The mirror 130 and the second mode converter 110 can be arranged in a ring geometry. For example, the mirror 130 and the second mode converter 110 can be arranged in a loop. The direction of propagation of waves can form a ring or a loop.

The mirror 130 and the mode converter can define the region 115 between the mirror 130 and the mode converter. The region 115 can contain a plurality of orthogonal modes (e.g., transverse modes) of a wave. The plurality of orthogonal modes can be defined by at least one of a polarization, a frequency, an amplitude, or a phase profile. The plurality of orthogonal modes contained in the region 115 can define (e.g., occur in, describe) an optical path of the wave. A sequence of mode conversions can define the optical path of the wave. The sequence of mode conversions that give rise to the plurality of modes can define the optical path of the wave. The region 115 can contain a plurality of orthogonal modes of a plurality of waves. The plurality of orthogonal modes contained in the region 115 can define (e.g., occur in) an optical path length of the wave. A sequence of mode conversions can define the optical path length of the wave. The sequence of mode conversions that give rise to the plurality of modes can define the optical path length of the wave. The optical path length can be a parameter that defines one or more properties of the cascaded-mode resonator 100. Manipulating the optical path and/or the optical path length can allow for the manipulation of second order parameters (e.g., resonance lines, largest possible frequency contained in the resonator, etc.).

The wave, when sent from outside the region and when propagating from the mirror 130 towards the mode converter, can include the first mode 120 of the plurality of orthogonal modes. The first mode 120 of the plurality of orthogonal modes can be contained in the region 115.

The mode converter can convert the wave from the first mode 120 of the plurality of orthogonal modes, to the second mode 125 of the plurality of orthogonal modes that is different from the first mode. The first mode 120 can be different from the second mode 125. For example, the polarization of the first mode 120 can be different from the polarization of the second mode 125. The frequency of the first mode 120 can be different from the frequency of the second mode 125. The amplitude of the first mode 120 can be different from the amplitude of the second mode 125. The phase profile of the first mode 120 can be different from the phase profile of the second mode 125. The second mode 125 of the plurality of orthogonal modes can be contained in the region 115.

The mirror 130 can reflect the wave with the second mode 125 of the plurality of orthogonal modes towards the mode converter. The mirror 130 can reflect the wave from an $N^{th}$ mode of the plurality of orthogonal modes, to the first mode 120 of the plurality of orthogonal modes, where N is an integer value that is equal to or larger than 2. The $N^{th}$ mode can include an intermediate mode.

The mode converter can convert the wave from the second mode 125 of the plurality of orthogonal modes to the first mode 120 of the plurality of orthogonal modes. The mirror 130 can reflect the wave with the first mode 120 of the plurality of orthogonal modes towards the mode converter.

In some embodiments, the first mode 120 of the plurality of orthogonal modes can include a first propagation constant (e.g., $\beta_1$). The second mode 125 of the plurality of orthogonal modes can include a second propagation constant (e.g., $\beta_2$). The second propagation constant can be different from the first propagation constant. The first propagation constant can determine how the amplitude and phase of light with a given frequency varies along a propagation direction. The first propagation constant can depend on the optical frequency of light. The second propagation constant can determine how the amplitude and phase of light with a given frequency varies along a propagation direction. The second propagation constant can depend on the optical frequency of light.

By suitable choice of mode converters, the round-trip phase can be given by Equation 3:

$$\Delta\phi = k_0 L \xi \sum_{i=1}^{N} n_{\it{eff},i} + \phi_{r,tot} \quad (3)$$

Here, $\phi_{r,tot}$ is the sum of all reflection phases, and $\xi$ is the parameter that encodes whether the contributing transverse modes appear once or twice in the chain of cascaded modes. This parameter can equal one or two depending on the configuration of mode conversions. The corresponding resonance condition of a general cascaded-mode resonator then translates to Equation 4 for example:

$$v_m = \frac{c(m - \phi_{r,tot}/(2\pi))}{L\xi \sum_{k=1}^{N} n_{\it{eff},i}} \quad (4)$$

Equation 4 can revert to the resonance condition o a e.g., traditional) resonator, Equation 2, in the case where only one mode is involved in the cascade (N=1, $\xi$=2, $\phi_{r,tot}$=2$\phi_r$).

The implications of Equation 4 can be profound. First, the round-trip phase may not be merely determined by the length of the resonator and the refractive index but by the total phase incurred by the various coupled transverse modes. The spectrum of a supermode can be understood by comparing Equation 4 and Equation 2. The frequency separation of the modes (e.g., the free spectral range) can be determined by the sum of the round-trip optical paths of the different cascaded modes $L\xi\sum_{i=1}^{N} n_{\it{eff},i}$ rather than by $2n_{\it{eff},i}L$ as in a conventional resonator operating on a single transverse mode. Whereas traditional (e.g. non-cascaded-mode) resonators can feature a superposition of different spectra, each corresponding to a different transverse mode, cascaded-mode resonators of the present disclosure can exhibit just one super-spectrum in which the amplitudes of the modes are coupled, as demonstrated by the spectra in FIGS. 1C and 1D.

This analysis can be independent of how the mode conversions are achieved in a physical structure. For instance, in the context of transverse modes in waveguides, a mode converter can be implemented using an effective refractive index variation that provides a wave vector change to the incident mode equal to the difference in the propagation constants between the reflected and the incident mode.

In the fourth column of FIGS. 1A-1D, an abstraction is shown to visualize cascaded-mode resonances using directed graphs. Here, the vertices can represent the modes of the system and the lines between these vertices can represent the mode converters. Cascaded-mode resonances can be identified in this picture by representing each mode i as a forward and a backward propagating mode, respectively labeled i and −i. In this picture, resonances can correspond to cyclic graphs because a path is created in which, after a number of cascades, the initial mode is regenerated at the initial location. Thus, cyclic directed graphs can provide a convenient way to analyze a system with many mode conversions. The round-trip phase resonance condition can be considered to get insights into the spectrum of cascaded-mode resonators.

To obtain a picture of this spectrum, both the phase and the amplitude of the different traveling waves bouncing back and forth can be considered. In a rigorous calculation of the spectrum, the waves that exit the resonator after each round trip due to the partial transmission of the mode converters can be computed. The transmission spectrum can include an infinite sum of partially transmitted waves that interfere with each other. In the case of a cascaded-mode resonator with two coupled modes, as shown in FIG. 1C, the transmission spectrum is given by Equation 5 for example:

$$\frac{E_t}{E_{in}} = \frac{t_{pt} e^{ik_0 n_{\it{eff},1} L}}{1 - r_{rt}^2 e^{i\Delta\phi}} \quad (5)$$

Here, the pass-through transmission coefficient $t_{pt}$ is the product of the transmission amplitudes of the first and second mode converter, while the round-trip reflection coefficient $r_{rt}$ is the product of the different reflection efficiencies in one round trip, and $\Delta\phi$ is the phase acquired in one round trip. The round-trip phase can depend explicitly on the frequency, as shown in Equation 3, while $t_{pt}$, $r_{rt}$ and $n_{\it{eff},1}$ can be implicitly also frequency-dependent parameters, depending on the specific implementations of the mode-converters and the resonator's medium.

The transmission spectrum of a general cascaded-mode resonator, where N different forward-propagating modes are coupled with each other, can be given by Equation 6:

$$\vec{E}_{out} = \sum_{i=1}^{N} \frac{t_{pt_i} e^{i\phi_i}}{1 - r_{rt} e^{i\Delta\phi}} E_{in} \vec{u}_{f_i} \quad (6)$$

Here, $t_{pt_i}$, $\phi_i$, and $\vec{u}_{f_i}$ are respectively the pass-through transmission amplitude, transmission phase, and unit vector of forward propagating mode i. Using Equation 6, the full spectral properties of the cascaded modes can be studied. Equation 6 can be similar to that of the Fabry-Perot transmission spectrum. Thus, a cascaded-mode resonator formally can have a similar spectrum to a non-cascaded-mode resonator, but the peculiarity of the spectrum can lie in the modification of the parameters. In particular, the phase parameter $\Delta\phi$ can play a unique role.

A feature of the spectrum can include the modified fundamental mode wavelength. The largest wavelength $\lambda_0$ that can be confined in a non-cascaded-mode resonator is approximately that for which $\lambda = \lambda_0/n_{\it{eff}} = 2L$. In the case of cascaded-mode resonances, this picture can be different. The largest wavelength can be given by Equation 7:

$$\lambda_0 = L\xi \sum_{i=1}^{N} n_{\it{eff},i} \left(1 - \frac{\mathrm{mod}(\phi_{r,tot}, 2\pi)}{2\pi}\right)^{-1} \quad (7)$$

Here, mod refers to the modulo operation, comparing the phase to the nearest multiple of $2\pi$. The largest wavelength that can be confined effectively can be much larger than the resonator's dimensions if a significant number N of transverse modes are coupled together. This occurs through a combination of two effects, as visualized in FIG. 2A, where the left panel shows a plot of the frequency of the longitudinal modes versus mode index m. A non-cascaded-mode resonator with a maximum effective index $n_{eff,max}$ can be compared with a cascaded-mode resonator with the same $n_{eff,max}$. The fundamental frequency of a cascaded-mode resonator can be lower than that of the non-cascaded-mode resonator because of, on the one hand, the smaller gradient of the line connecting the resonance frequencies, given by $(\xi/2\Sigma_{i=1}^{N} n_{eff,i}/n_{eff,max})^{-1}$, and, on the other hand, a lower intercept on the y axis, determined by $-\phi_{r,tot}/(2\pi)(\xi/2\Sigma_{i=1}^{N} n_{eff,i}/n_{eff,max})^{-1}$. Physically, this can be understood as follows: compared with a non-cascaded-mode resonance, a supermode can acquire a larger propagation phase (e.g., smaller gradient) in combination with a larger reflection phase (e.g., lower intercept). Both effects can contribute to a larger round-trip phase for a fixed resonator length. In the right panel of FIG. 2A, the ratio of the largest wavelength in a cascaded-mode resonator to that in a non-cascaded-mode resonator as a function of the two preceding parameters: the cascaded effective index $n_{eff,c}=\xi/2 \Sigma_{i=1}^{N} n_{eff,i}$, normalized by maximum effective index $n_{eff,max}$, and the total cascaded reflection phase due to the mode conversions $\phi_{r,tot}/(2\pi)$ is shown. FIG. 2A illustrates the resonance condition versus longitudinal mode number m, as defined in Equation 4, comparing the non-cascaded-mode resonator 5 and the cascaded-mode resonator 100 with identical $n_{eff,max}$. The sum of the coupled effective indices $$\left(n_{eff,c} = \xi/2\sum_{i=1}^{N} n_{eff,i}\right)$$

determines the slope of the cascaded-mode spectrum ($\theta$=arctan $$\left[\left(\xi/2\sum_{i=1}^{N} n_{eff,i} / n_{eff,max}\right)^{-1}\right].$$

The cascaded reflection phase shift of the mode conversions ($\phi_{r,tot}$) determines the intercept with they axis $$\left(\overline{\phi}_r = -\phi_{r,tot}/(2\pi)\left(\xi/2\sum_{i=1}^{N} n_{eff,i} / n_{eff,max}\right)^{-1}.$$

The fundamental frequency can be much lower than in a non-cascaded-mode resonator. In the density plot on the right we illustrate the ratio of the fundamental wavelength inside a cascaded-mode resonator to the fundamental wavelength in a non-cascaded-mode resonator versus the cascaded effective index $n_{eff,c}$, normalized by $n_{eff,max}$, and the cascaded reflection phases $\phi_{r,tot}$, normalized by $2\pi$.

This mechanism can be compared with other resonator designs that confine waves with a free-space wavelength much larger than the dimensions of the resonators. A first example can include the set of devices in which the wavelength in the resonator is adjusted (e.g., using metals or dielectrics with a large refractive index). However, a fundamentally different mechanism can be at work here. In a cascaded-mode resonator, the local refractive index can remain unchanged, but the confinement can occur through the cascading of transverse modes that all combine into one mode and increase the effective phase after a round trip of that mode. In other words, $2Ln_{eff,i}$ can be replaced by $$L\xi\sum_{i=1}^{N} n_{eff,i}.$$

A second can include sub-wavelength resonators that can be created by adjusting the reflection phase of the mirrors (e.g., by implementing metasurface mirrors). This mechanism can be equivalent to the role played by $\phi_{r,tot}$ in the above analysis. In this type of resonator, the slope of the frequency versus mode number remains along the bisector in FIG. 2A, but the line is shifted downwards.

Figure 2B:
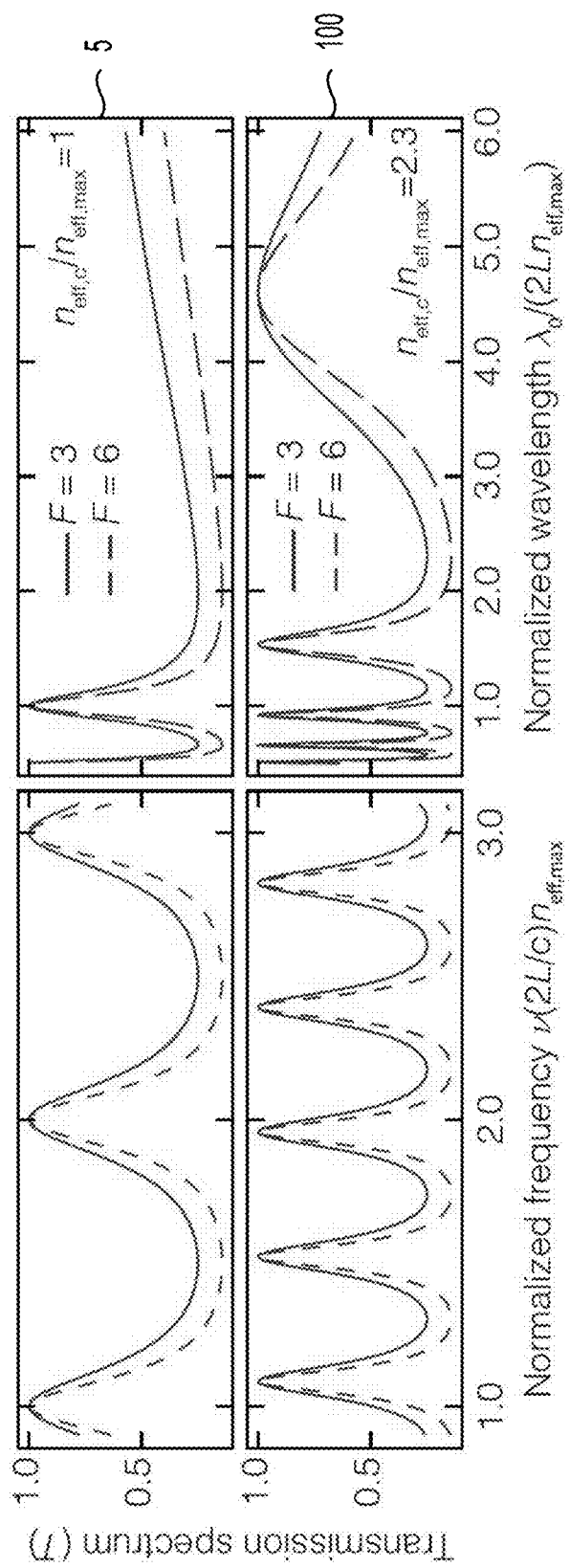

A feature of cascaded-mode resonances can include the modification of the free spectral range $\Delta v$. As can be evident from the model described above based on the resonance equation, this free spectral range may not be determined solely by the resonator's length and refractive index, but by the length traversed by the sum of all cascaded modes, each weighted by their effective refractive index. Because the free spectral range can include the spectral distance between two resonance peaks, there may also be a contribution due to the dispersion of the effective refractive indices. Therefore, as can be the case in non-cascaded-mode resonators, the effective index may be replaced by the group index of the modes to calculate the free spectral range. The free spectral range of cascaded-mode resonators can be given by Equation 8:

$$\Delta v = \frac{c}{\xi\sum_{i=1}^{N} n_{g,i}L} \qquad (8)$$

where $n_{g,i}$ is the group index of transverse mode i at frequency v. Both preceding effects (e.g., the shift of the maximal resonance wavelength and the modification of the free spectral range) can be visualized in FIG. 2B. FIG. 2B illustrates the spectrum of a (e.g., non-cascaded-mode) resonator 5 compared with the spectra of cascaded-mode resonators 100 versus frequency (left panel) or wavelength (right panel). The top and bottom spectra respectively correspond to a non-cascaded-mode resonator 5 and cascaded-mode resonators 100 with $n_{eff,c}/n_{eff,max}=2.3$, $\phi_{r,tot}=1.5\pi$. The solid and dashed lines correspond to a resonator's finesse equal to 3 and 6, respectively. Note the reduction of the mode spacing (free spectral range) when several transverse modes are coupled.

Two other interrelated parameters can be associated with a resonant mode of a cavity: the linewidth $\gamma$ and the quality factor Q. Unlike the previous two ($\lambda_{0,max}$ and $\Delta v$), the linewidth and the quality factor can depend on the round-trip losses. In the case of negligible propagation losses, the round-trip loss for cascaded-mode resonators can be determined by the product of the efficiencies of all mode conversions involved in the cascade. A finesse parameter $F=4r_{rt}/(1-r_{rt})^2$ can be defined for these cascaded-mode resonators. The linewidth and the quality factor of the resonant modes can then depend on the finesse and the free spectral range according to the formulas: $\Delta\gamma=\Delta v/F$ and $Q=v/\Delta\gamma$.

Figure 2C:
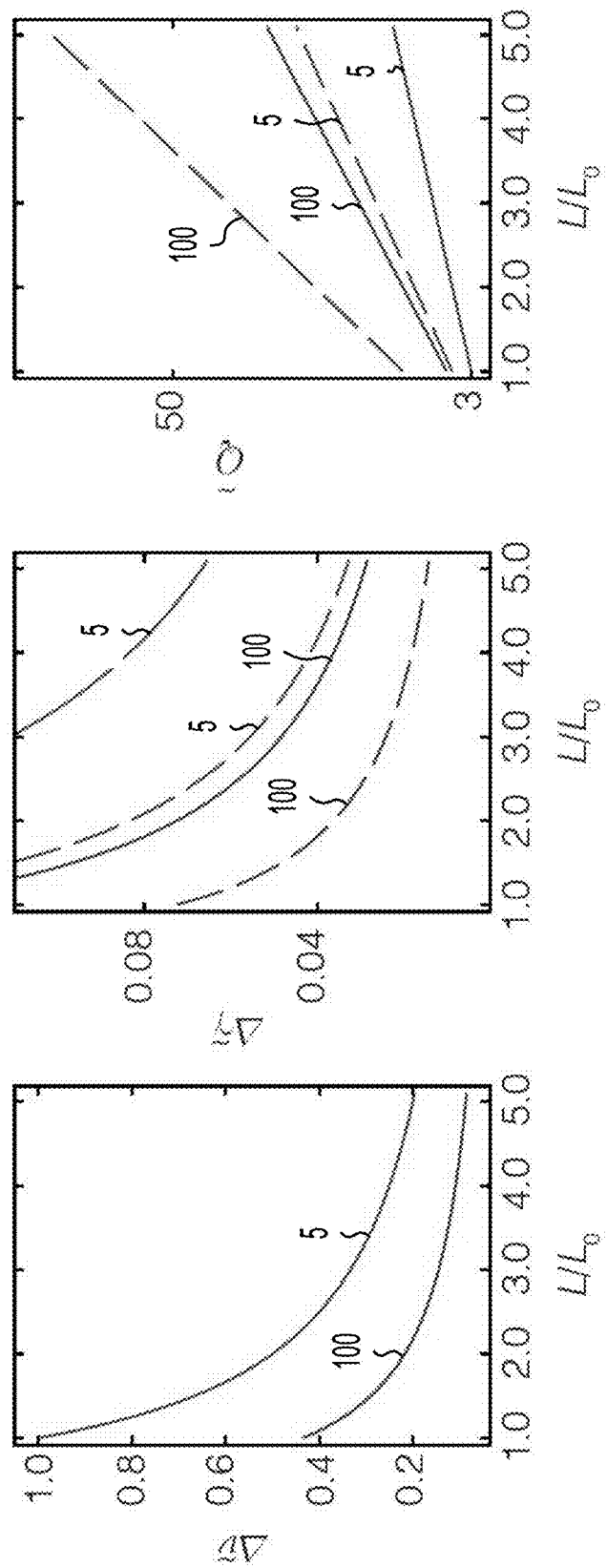

Thus, for a given percentage of loss in one round trip, the linewidth can scale inversely proportional to the number of cascaded modes, as does the free spectral range. Likewise, the quality factor can scale proportionally to the number of cascaded modes. FIG. 2C illustrates how these parameters change when varying the length of the resonator L, and compare a non-cascaded-mode resonator 5 with a cascaded-mode resonator 100. FIG. 2C illustrates the variation of the spectral parameters, normalized with respect to the maximum effective index ($n_{eff,max}$) and arbitrary length $L_0$, versus resonator length ($L/L_0$): the free spectral range $\Delta\tilde{v}=\Delta v 2n_{eff,max}L_0/c$, the resonance linewidth $\tilde{\gamma}=\gamma 2n_{eff,max}L_0/c$, and the quality factor $\tilde{Q}=Qc/(2n_{eff,max}L_0 v)$.

Coupling several modes can increase the total phase accumulation in a round trip-which can increase Q—but this can also cause extra losses by introducing extra mode conversions-which can lower Q. After all, inefficient mode conversions can add an additional loss term and increase the overall round-trip loss. The above analysis can compare the resonators at a constant round-trip loss, which can be easier to achieve with fewer reflections.

The spectral properties, temporal properties, and spatial properties of these modes can be engineered by coupling transverse modes in a well-defined sequence. A parameter can include the intracavity power build-up time, which can scale proportionally to the number of coupled modes. This phenomenon can be intricately related to the scaling of the quality factor. While the intensity of longitudinal modes in non-cascaded-mode resonators can exhibit a simple standing-wave profile, the intensity profile in a cascaded-mode resonator can have a more irregular profile, potentially with many different local minima and maxima.

A unique spatial property of cascaded-mode resonators is that the propagation constant of a supermode can depend on the propagation direction. This phenomenon can be shown in its most straightforward implementation in FIG. 1C. When a field with spatial profile of mode 1 is incident on the left side of this resonator, a cascaded mode can exist with wave vector $k=k_0 n_{eff,1}$ propagating from left to right, and a wave vector $k=k_0 n_{eff,2}$ propagating from right to left. This behavior can have far-reaching implications for the manipulation of light-matter interactions inside the resonator. Due to the distinct propagation constants in opposite directions, directional nonlinear effects can occur in the resonator since the phase-matching conditions may only be satisfied in one direction. The directionality could also give additional control over chirality, a fundamental property in many physical systems, with applications ranging from topologically protected edge states to isolation and wavefront engineering. This same phenomenon can apply to optomechanical or quantum mechanical interactions inside the resonator.

A property of cascaded-mode resonances can include the existence of mode-independent spectra. Due to the nature of the modes that can include a cascade of different transverse modes, different transverse modes at the input may excite the same resonance (e.g., a mode-independent resonance). The different modes that excite the same resonance in a cascaded-mode resonator can be extracted from the adjacency matrix of the graph that encodes the different mode conversions in the resonator. The mode-independent behavior of cascaded-mode resonators can be an extraordinary transmission characteristic, a feature that can be verified experimentally as shown in FIG. 4. This is in contrast to non-cascaded-mode resonators, where different transverse modes can exhibit different transmission spectra. Based on this property of cascaded-mode resonators, it is possible to manipulate modes with different spatial profiles in an identical way using only one resonator.

The cascaded-mode resonator can be based on a silicon-on-insulator (SOI) platform, which can be used in on-chip photonics at telecom wavelengths (1550 nm). In this on-chip implementation, the cascaded modes can have distinct transverse profiles $TE_i$, an in-plane polarization and can propagate along waveguides rather than in free space. The SOI platform can offer design flexibility in engineering the properties of the mode converters (e.g., reflection phase and magnitude), as well as the propagation properties of all modes participating in the cascade, such as their effective indices $n_{eff,i}$, which can directly influence resonator parameters.

The device geometry is shown in FIGS. 3A and 3B together with scanning electron microscope (SEM) pictures of the fabricated structures. FIGS. 3A and 3B illustrate schematics of cascaded-mode resonators in integrated photonics. FIG. 3A illustrates SEM pictures of the cascaded-mode resonator which show two mode converters that are connected via a multi-mode waveguide of width $w_{wg}$ and length $L_{wg}$. Multimode waveguides located before and after the resonator can guide telecom light into and outside the resonator. The mode converters can be realized by corrugating the silicon waveguide laterally into the shape of a rectangular grating of periodicity $\Lambda$ and width $w_g$. The scale bar=5 μm and 2 μm (inset). The periodicity $\Lambda$ can be chosen such that the phase-matching condition is satisfied for contra-directional coupling. The entire photonic circuit ridge can be buried into a silica layer.

Each device can include three optical components: (1) input/output waveguides that couple and guide light of chosen transverse modes to and away from the mode-converting resonators, (2) a multi-mode waveguide section of length $L_{wg}$ in which the cascaded modes are confined, and (3) specialized corrugated Bragg reflectors located on either sides of the multi-mode waveguide that reflect one transverse mode into another one of choice, in some embodiments. While the number of conversions in a cascaded mode can be limited by the number of available transverse modes, the experimental demonstration can be restricted to cascaded-mode resonators of the type shown in FIG. 1C that couple the two distinct transverse modes $TE_0$ and $TE_2$. Their transverse mode profiles can be shown in the inset of FIG. 3B. The width of the waveguide in the cavity region ($w_{wg}$=1.07 μm) can be chosen such that it cuts off all transverse modes of a higher order than $TE_2$. In addition, the grating period $\Lambda$ of the mode converters can be chosen as to satisfy the phase-matching condition and provide the momentum for the mode conversion to occur on the reflected wave: $2\pi/\Lambda=\Delta\beta_{12}=\beta_1+\beta_2$, with $\beta_1=\beta_{TE_0}=n_{eff,TE_0}\omega_0/c$ and $\beta_2=\beta_{TE_2}=n_{eff,TE_2}\omega_0/c$ the propagation constants of the two coupled modes. This type of coupling can be referred to as contra-directional coupling.

FIG. 3B illustrates a schematic of an example embodiment of the device which shows three different sections: (1) two input waveguides (left) that allow the probing the resonator with either $TE_0$ (upper) or $TE_2$ (lower), (2) the resonator region consisting of the multimode waveguide enclosed by the two mode converters, and (3) two analyzer waveguides which transmit the output of the resonator into two spatially separated locations, depending on its transverse profile $TE_0$ (upper) or $TE_2$ (lower). The $TE_2$ probe mode can be generated inside the multimode waveguide prior to the resonator via co-directional coupling from a $TE_0$ mode that propagates in the nanowaveguide. Spatially, the coupling can occur at the location where the nanowaveguide is in the immediate vicinity of the multimode waveguide.

The strategy for designing the cascaded-mode resonators in the SOI platform can be outlined in more detail. A rectangular grating geometry that is symmetric with respect to the center of the ridge of the waveguide, has a periodicity $\Lambda$ and a duty cycle of 40% can be adopted as shown in FIG.

3A. The waveguide width in the corrugated area $w_g$ can be larger than the waveguide width in between the reflectors $w_{wg}$. The phase-matching condition above can be symmetric upon a permutation of $\beta_1$ and $\beta_2$, and the mode conversion grating can be reciprocal under reflection of incident light with a transverse mode profile $TE_0$ into $TE_2$, and vice-versa. The selectivity of the mode converters can be ensured. The mode converters can reflect only the desired mode couple. The grating periodicity that satisfies the contra-directional coupling condition can be much shorter than the one that meets the co-directional coupling condition, in which case the converted mode would propagate in the same direction as the incident mode. Moreover, a reflection of the incident field into the same transverse mode ($TE_0$ into $TE_0$ or $TE_2$ into $TE_2$) can occur if the grating periodicity $\Lambda$ satisfies $2\pi/\Lambda=2\beta_1$ or $2\pi/\Lambda=2\beta_2$. To selectively satisfy only one of these phase-matching conditions and selectively convert only the desired modes, all periodicities may need to be sufficiently different from each other. As a result, a design target can include engineering the effective indices of the two coupled modes to be as different as possible. This property can be directly linked to the transverse dimensions of the waveguide. At the same time, low propagation loss and good confinement of the $TE_2$ mode to the waveguide core can be satisfied. As shown in the mode profile of FIGS. 3A and 3B, a waveguide width of $w_{wg}=1.07$ μm can provide an index difference $n_{eff,TE_0}-n_{eff,TE_2}=2.751-1.944=0.807$.

The spectral response of each resonator can be investigated under incident light that is either prepared to be in the $TE_0$ or $TE_2$ transverse mode. At first, the light can be directed from an optical fiber placed above the chip into low-loss single-mode waveguides via grating couplers and adiabatic tapers. The single-mode waveguides can filter any undesired higher-order transverse modes that may be excited by the grating couplers. An adiabatic taper can ensure a low-loss transmission of the $TE_0$ mode in the top arm of FIG. 3B from the single-mode waveguide to the multimode waveguide that precedes the cascaded-mode resonator. Two distinct input/output ports, as shown in FIG. 3B, can be patterned around the resonator. The input/output ports can allow for the preparation of the input states entering the resonators and analyzed states exiting the resonator to be either in the $TE_0$ or $TE_2$ transverse mode. To this end, if the light is incident in the bottom arm of FIG. 3B, $TE_2$ mode can be generated from $TE_0$ before the resonator using a co-directional evanescent coupler based on a nano-waveguide located next to the multimode waveguide. This coupling can be visualized in the inset of FIG. 3B. This forward mode coupler can operate on the principle that the effective index of the $TE_0$ mode in the nano-waveguide corresponds to the effective index of the $TE_2$ mode in the multimode waveguide. As a result, the $TE_2$ mode can be coherently excited by the $TE_0$ mode. From the example embodiments of FIGS. 11A and 11B, this condition can be satisfied if the nano-waveguide width equals 336 nm. The full-wave simulated field in FIG. 12 can demonstrate an efficient forward coupling with 70% transmission at an interaction length of $L_{int}=60$ μm.

In some embodiments, the cascaded-mode resonator 100 can be part of an inline device. The inline device can include a first free-space input channel 305 (e.g., waveguide, optical fiber, etc.) coupled with the first mode converter 105. The cascaded-mode resonator 100 can include a second free-space input channel 310 coupled with the second mode converter 110. In the free-space implementation, the resonator 100 can be formed in between two free-space mode-converters. For example, the resonator 100 can be formed between the first mode-converter 105 and the second mode converter 110. The first mode-converter 105 can include a first free-space mode converter. The second mode-converter 110 can include a second free-space mode converter. In the free-space implementation, the modes can correspond to the transversal modes of the free-space system (e.g., using the different polarizations or orbital angular momentum basis). Free-space can include light propagating in free space (e.g., without wires, in air, in a vacuum, etc.).

In some embodiments, the cascaded-mode resonator 100 can be part of an inline device. The inline device can include the first free-space input channel 305 (e.g., waveguide) coupled with the mirror 130. The cascaded-mode resonator 100 can include the second free-space input channel 310 coupled with the first mode converter 105. The cascaded-mode resonator 100 can include the second free-space input channel 310 coupled with the second mode converter 110.

Figure 3C:
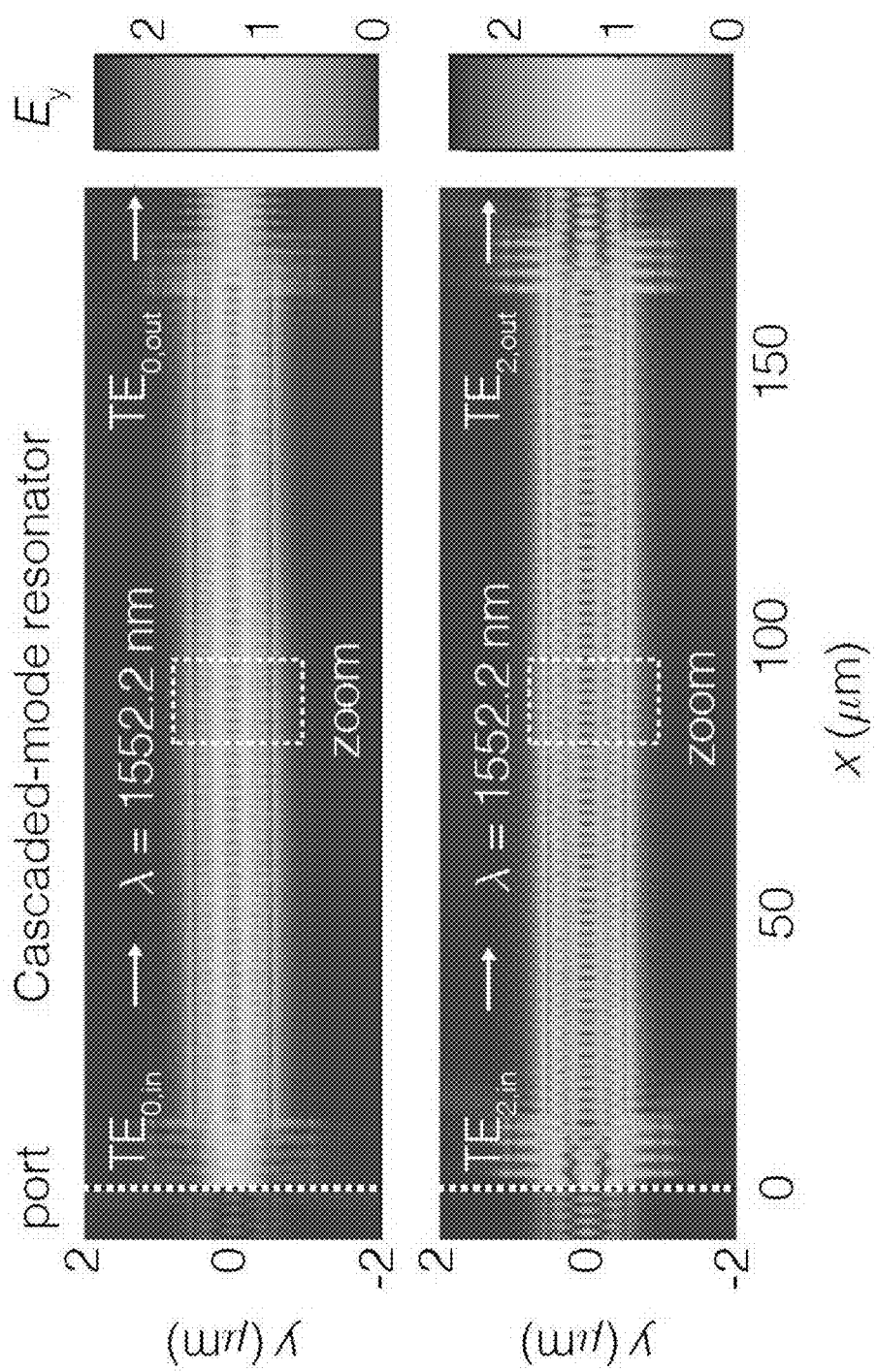
FIG. 3C illustrates full-wave simulations of telecom fields inside a cascaded-mode resonator, according to an example embodiment.

Experiments and simulations can demonstrate a signature of cascaded-mode resonators: the mode-independent spectrum with modified spectral parameters. The symmetric cascaded-mode resonator of FIG. 1C can provide resonant confinement to input modes that correspond to either $TE_0$ or $TE_2$ transverse modes and has the same transmission spectrum for either input. FIG. 3C can confirm this computationally. FIG. 3C illustrates the simulated field profile of the same cascaded-mode resonator for the two possible inputs and find a locally enhanced field inside the resonator in both cases. FIG. 3C illustrates full-wave simulations of the telecom fields inside the cascaded-mode resonator which demonstrate that self-consistent solutions of the round-trip condition occur at the same input wavelength for two distinct transverse modes $TE_0$ (upper) and $TE_2$ (lower).

Figure 3D:
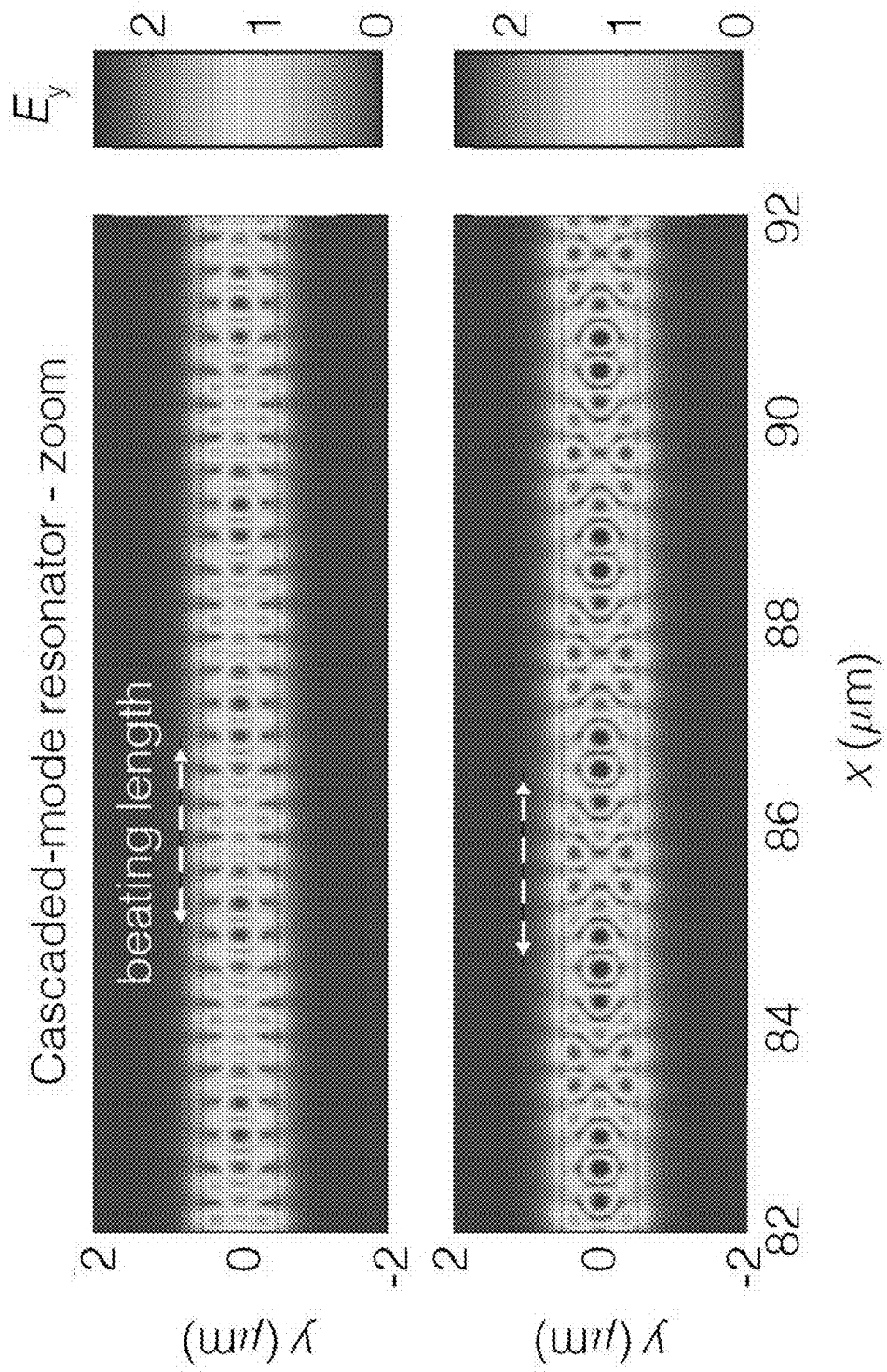
FIG. 3D illustrates an enlarged view of the dashed rectangles shown in FIG. 3C, according to an example embodiment.

Moreover, the hybrid nature of the near-infrared cascaded mode inside the resonator can be apparent in the zoom-in of the spatial profile shown in FIG. 3D. FIG. 3D illustrates an enlarged view of the dashed rectangles shown in FIG. 3C. FIG. 3D illustrates the hybrid nature of the cascaded modes that arise as a superposition of counter-propagating $TE_0$ or $TE_2$ modes with a characteristic beating length that does not depend on the input probe field. The field profile can be decomposed into a superposition of counter propagating $TE_0$ and $TE_2$ waveguide modes that exhibit the same beating length for both inputs (marked by the arrow). This property can be demonstrated experimentally by transmission spectroscopy and contrasted with two test Fabry-Perot resonators that employ standard mirrors and provide cavity confinement to only one of $TE_0$ or $TE_2$ modes.

The experimental results are shown for the three cases in FIGS. 4A-4K: cascaded-mode resonator (FIGS. 4D and 4E showing measurements and FIGS. 4F and 4G showing simulations), Fabry-Perot resonator operating on the $TE_0$ mode (FIGS. 4H and 4I) and Fabry-Perot resonator operating on the $TE_2$ mode (FIGS. 4J and 4K). Comparing the three cases, cavity modes can appear for both $TE_0$ and $TE_2$ modes in the case of the cascaded-mode resonator only. Moreover, the experimental results can be well-reproduced by the simulations. Cavity modes can appear only for one of the two modes for the Fabry-Perot resonators, while light is simply transmitted for the other modes.

FIG. 4A illustrates a cascaded-mode resonator, where a reflection at both the left and the right Bragg mirror can result in a conversion of the transverse mode from $TE_0$ to $TE_2$ and vice-versa. FIGS. 4B and 4C illustrates Fabry-Perot resonators, where no mode conversion occurs upon reflection. Two types of Fabry-Perot resonators are considered, where the Bragg mirror provides selective reflection to either mode $TE_0$ (FIG. 4B) or mode $TE_2$ (FIG. 4C). FIGS.

4D and 4E illustrate the measured transmission spectra of the cascaded-mode resonator. The measured transmission spectra can exhibit resonances regardless of whether $TE_0$ or $TE_2$ is incident onto the resonator. These mode-independent resonances can be a feature of cascaded-mode resonators. FIGS. 4F and 4G illustrate simulated transmission spectra. The simulated transmission spectra can reproduce the measurements. FIGS. 4H and 4I illustrate measured transmission of Fabry-Perot resonators for the case that either $TE_0$ or $TE_2$ is incident onto the resonator. The Bragg mirrors can reflect selectively only $TE_0$ and no mode conversion occurs. Cavity modes can appear only for the $TE_0$ input. FIGS. 4J and 4K illustrate the Bragg mirrors which only reflect $TE_2$ and no mode conversion occurs. Cavity modes appear only for the $TE_2$ input. In all measurements and simulations, the analyzed mode (output mode) can be the same as the probe mode (input mode) and the transmission curves can be normalized to the transmitted intensity of a bare waveguide without any resonator. FIGS. 4D, 4F, 4H, and 4J illustrate transmission measurements under a $TE_0$ probe/analyzed mode. FIGS. 4E, 4G, 4I, and 4K illustrate transmission measurements under a $TE_2$ probe/analyzed mode.

In some embodiments, the wave can include a first wave. The first wave can include a first spectrum. The cascaded-mode resonator 100 can include a second wave. The second wave, when propagating from the first mode converter towards the second mode converter, can include a second spectrum. The first spectrum and the second spectrum can be the same. For example, different input modes can lead to the same spectrum. The first spectrum can include a transmission spectrum (e.g., transmission values at various wavelength). The second spectrum can include a transmission spectrum (e.g., transmission values at various wavelength). The spectra of all modes (e.g., orthogonal modes) can be the same.

Figure 5A:
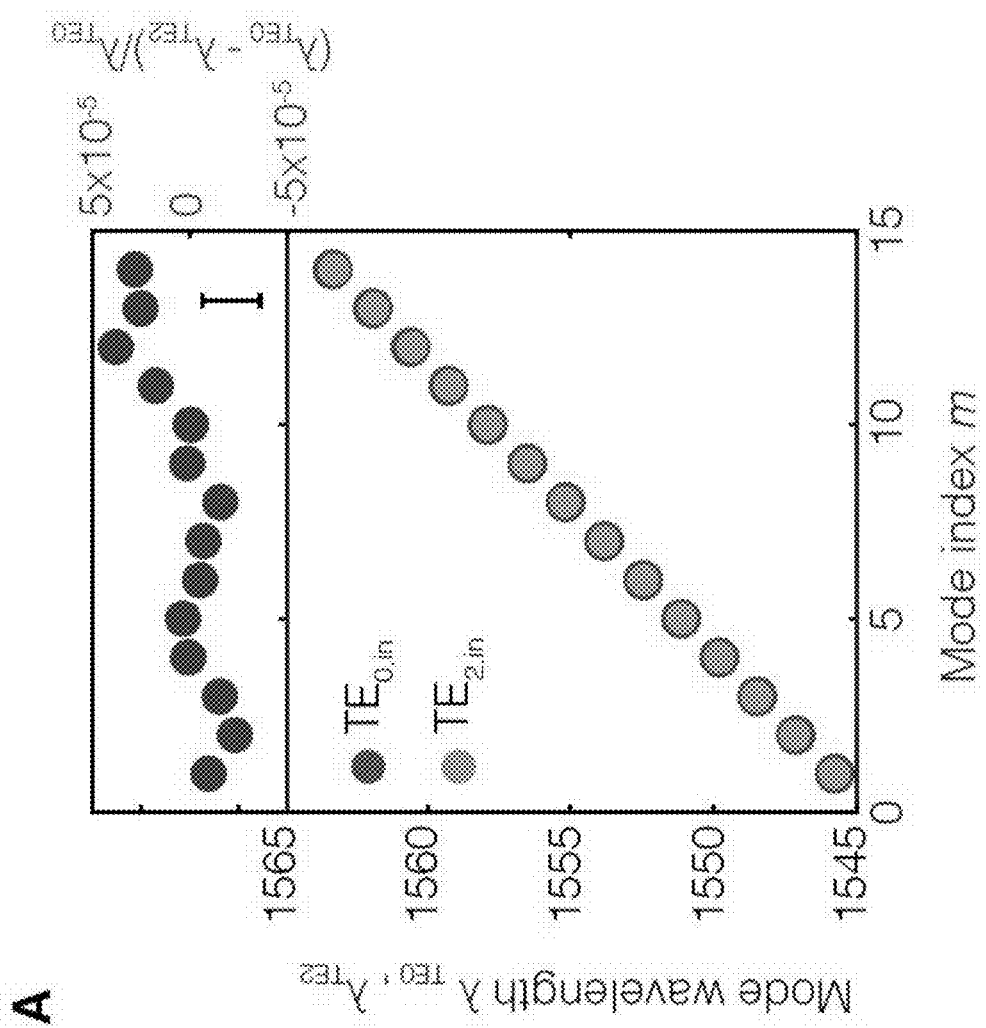
FIGS. 5A-5C illustrate characteristic parameters of the cascaded-mode resonator extracted from the experimental transmission spectra, according to an example embodiment.
Figure 5B:
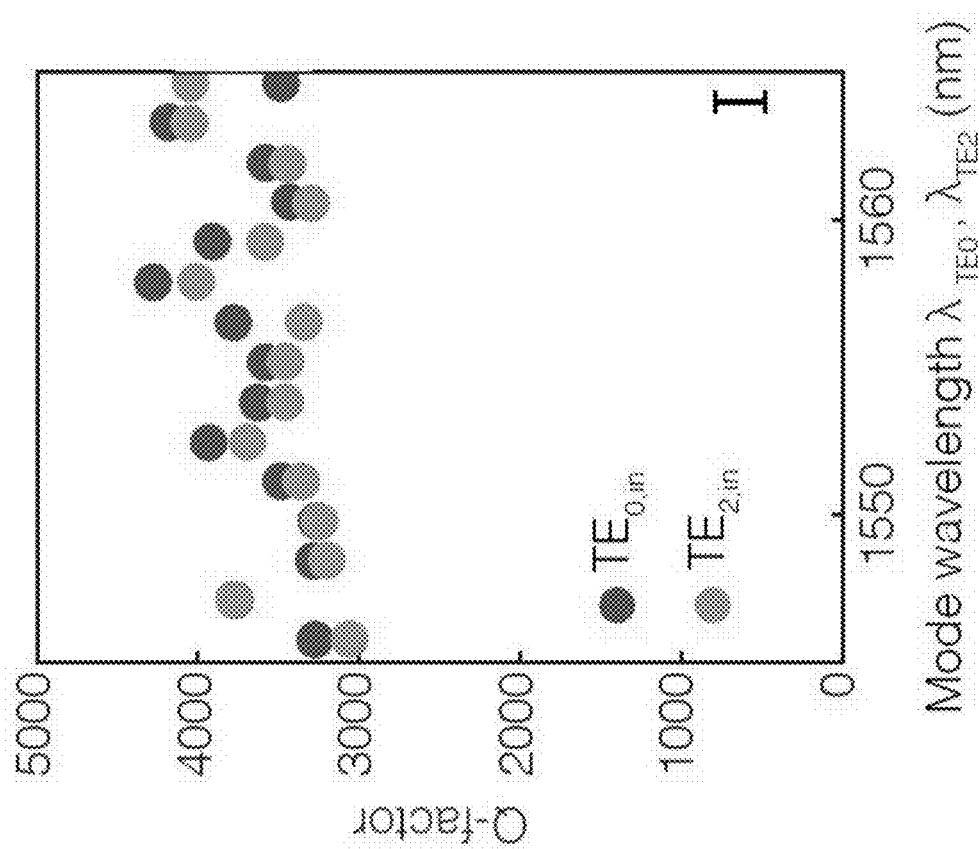
Figure 5C:
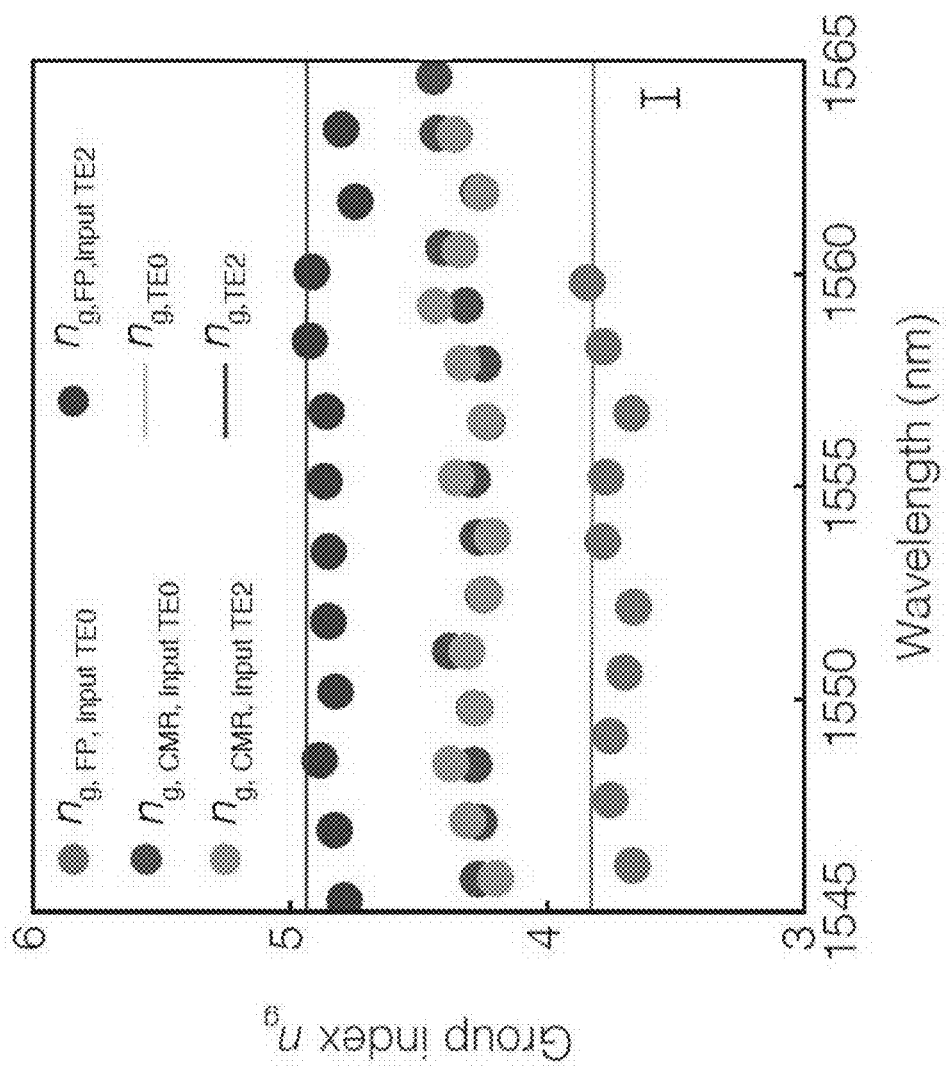

The resonator properties of the cavity modes associated with the cascaded-mode resonators compared with the Fabry-Perot modes in FIG. 5 can be analyzed and compared with theoretical predictions. FIG. 5A illustrate that the intra-cavity modes of the cascaded-mode resonators excited by the two inputs ($TE_0$ or $TE_2$) can coincide in frequency. There can be negligible relative deviation between the two sets of resonant wavelengths of $(\lambda_{TE_0}-\lambda_{TE,2})/\lambda_{TE_0} 4 \times 10^{-5}$. Furthermore, the quality factors of the two sets can be approximately equal, as shown in FIG. 5C. The group index of the cascaded modes can be approximately equal to $n_g=4.3$, regardless of whether they are excited by $TE_0$ or $TE_2$. In contrast, the group index of the Fabry-Perot modes can be equal to $n_{g,TE_0}=3.75$ and $n_{g,TE_2}=4.85$. This result can confirm the cascaded mode character of the measured spectra, in particular because the group index can be approximately the arithmetic mean of the group indices of the participating transverse modes, in agreement with Equation 8.

The cascaded-mode resonator 100 can feature two mode-converting Bragg mirrors that convert $TE_0$ into $TE_2$ and vice-versa. FIG. 5A illustrates the mode-independent character of cascaded-mode resonators 100. The mode-independent character of cascaded-mode resonators 100 can be demonstrated by the fact that the resonant wavelengths of the cavity modes can coincide in frequency (and wavelength), regardless of whether the resonator is probed by a $TE_0$ or $TE_2$ mode. The relative experimental mismatch between their resonant wavelengths $(\lambda_{TE_0}-\lambda_{TE_2})/\lambda_{TE_0}$ can be below $4 \times 10^{-5}$, for all 13 considered modes, which is comparable to the experimental noise (upper panel). FIG. 5B illustrates that the quality factors of the cascaded-mode resonator are mode-independent, as they coincide within the experimental error, regardless of whether the cascaded modes are excited by $TE_0$ or $TE_2$ inputs. The experimental error can be calculated from the error of the fit through the resonance peaks. FIG. 5C illustrates that in cascaded-mode resonators, the propagation constants can change magnitude at each reflection off a mode-converting Bragg mirror, and the group indices of cascaded-mode (CM) resonances can be equal to the arithmetic mean of Fabry-Perot (FP) resonances in the same multimode waveguide. This property can be confirmed experimentally, with $TE_0$ modes having a group index of 3.75, $TE_2$ modes having a group index of 4.85 and cascaded modes having a group index of 4.3. Full lines represent calculated group indices from full-wave simulations. Vertical bars represent error bars.

Electromagnetic resonators can be generalized to cascaded-mode resonators, where the spectrum of supermodes reflects the generalized round-trip phase condition of a cascade of different transverse modes propagating in different directions. The theory can be generally valid for any cascade of orthogonal modes inside cavities of arbitrary shape, and is thus not only applicable to a cascade of transverse mode profiles of an integrated waveguide. For the round trip to occur after N conversions, the N+1-th mode in the chain can be indistinguishable from the first mode (e.g., with identical frequency, temporal shape, k-vector, polarization, and phase profile). Therefore, the theory can be applied equally well for a cascade of modes with, for example, different spin or orbital angular momenta.

Traditional resonators can be regarded as a special case of the theory ($\xi=2$, $N=1$), while the full generalization to cascaded-mode resonators opens up interesting design perspectives: the spectral, temporal, and spatial properties are no longer solely determined by the length and refractive index of the medium, but also by the number of coupled modes and the sum of the corresponding reflection phases. This insight can allow for circumventing of existing trade-offs and, for example, the design of resonators smaller than the local wavelength.

In addition to a broadening of the design possibilities of existing resonance parameters (e.g., fundamental mode, free spectral range, linewidth, or quality factor), the resonators of the present disclosure can exhibit completely new properties not found in their traditional counterparts, such as mode-independent resonances. Based on this property, it can be possible to identically manipulate modes with different spatial profiles using only one resonator. This is also a feature in the context of lasers. Different incident transverse modes can give rise to the same resonance spectrum and simultaneously satisfy the lasing round-trip condition.

An example of a new property of cascaded-mode resonators is that the resonances can exhibit directionally dependent propagation properties. This property can be particularly interesting for manipulating non-linear or magneto-optical interactions. There can be cascaded-mode configurations where, due to the symmetry breaking of the propagation directions, a specific non-linear interaction can only take place in one direction. Also in the context of cavity optomechanics, this phenomenon can cause a directionally dependent transfer of optical momentum.

The concept of cascaded-mode resonators can be further exploited in a broad class of technological devices and scientific experiments since the underlying principles of cascaded-mode resonances can be extended even beyond optics.

The maximal round-trip phase that can be obtained in a cavity of length L with N different transverse modes, each experiencing an effective index $n_{eff,i}$, can be calculated. A central observation in this derivation can include the maximum number of times a transverse mode can be excited in one round trip. Each transverse mode can occur only two times in the round trip: once in each direction. Each mode can only be coupled with another mode in the left and right ends of the resonator. In general, mode i can be coupled to mode j on the left end through the conversion $\Delta ij$, and i will be coupled to k on the right end through the conversion $\Delta ik$. Adding an extra conversion on either side can split the cascade of modes into sub-chains but not increase the round-trip phase of either chain. The maximum round-trip phase can be obtained by having each mode occur two times (e.g., once in both directions) in one large cascade. The total propagation round-trip phase $\Delta\phi_p$ that maximally can be obtained can be given by the sum of all propagation phases as shown in Equation 9:

$$\Delta\phi_p = 2k_0 L \sum_{i=1}^{n} n_{eff,i} \tag{9}$$

Additionally, at each reflection, the wave may experience a nontrivial phase shift. The total maximum round-trip phase can be given by Equation 10:

$$\Delta\phi_p = 2k_0 L \sum_{i=1}^{n} n_{eff,i} + 2\sum_{i=1}^{N} \phi_{r,i,i+1} \tag{10}$$

where $\phi_{r,i,i+1}$ is the reflection phase upon conversion from mode i to i+1. The transversal modes can be numbered in order of appearance in the cascade. In this notation, mode N+1 can be the first mode again.

The transmission spectrum of a general cascaded-mode resonator can be derived. The partially transmitted fields through the resonator as the field inside the resonator travels back and forth can be calculated. This can be done in the most general case where N different forward modes are coupled with each other.

The modes can be numbered 1 to N. Because of the cyclic nature of the mode conversions, the first node can be renamed to coincide with the incident mode and subsequently all the other nodes can be renamed in the order that they appear in the loop.

An incident field can be partially transmitted through the resonator, after being transmitted through the first and second reflector and propagating through the cavity. Assuming that the product of the two transmissions through the first and second reflector is given by $t_{pt}$, Equation 11 can be given by:

$$\vec{E}_{out,1} = t_{pt1} e^{i\phi_1} E_{in} \vec{u}_{f_1} \tag{11}$$

The parameter $t_{pt_1}$ encodes the transmission efficiency through both reflectors. The unit vector $\vec{u}_{f_1}$ keeps track of the vectorial nature of the field (e.g., the specific mode that is transmitted), in this case forward mode f1.

A significant portion of the field can stay inside the resonator and can convert to another mode at the second reflector. After one backward and one forward propagation of the wave, the second partially transmitted field can be given by Equation 12:

$$E_{out,2} = t_{pt2} e^{i\phi_2} E_{in} \vec{u}_{f_2} \tag{12}$$

Figure 6A:
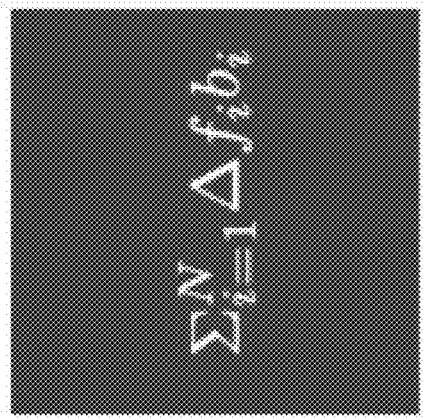
FIGS. 6A-6C illustrate a derivation of the transmission spectrum of a general cascaded-mode resonator, according to an example embodiment.
Figure 6A:
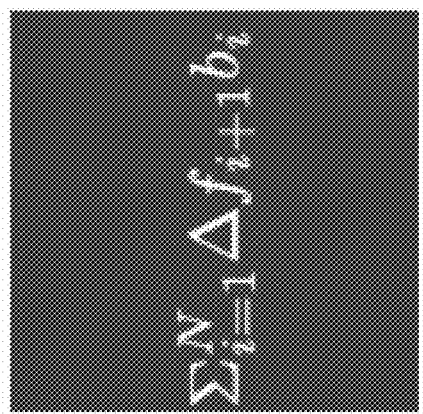
Figure 6B:
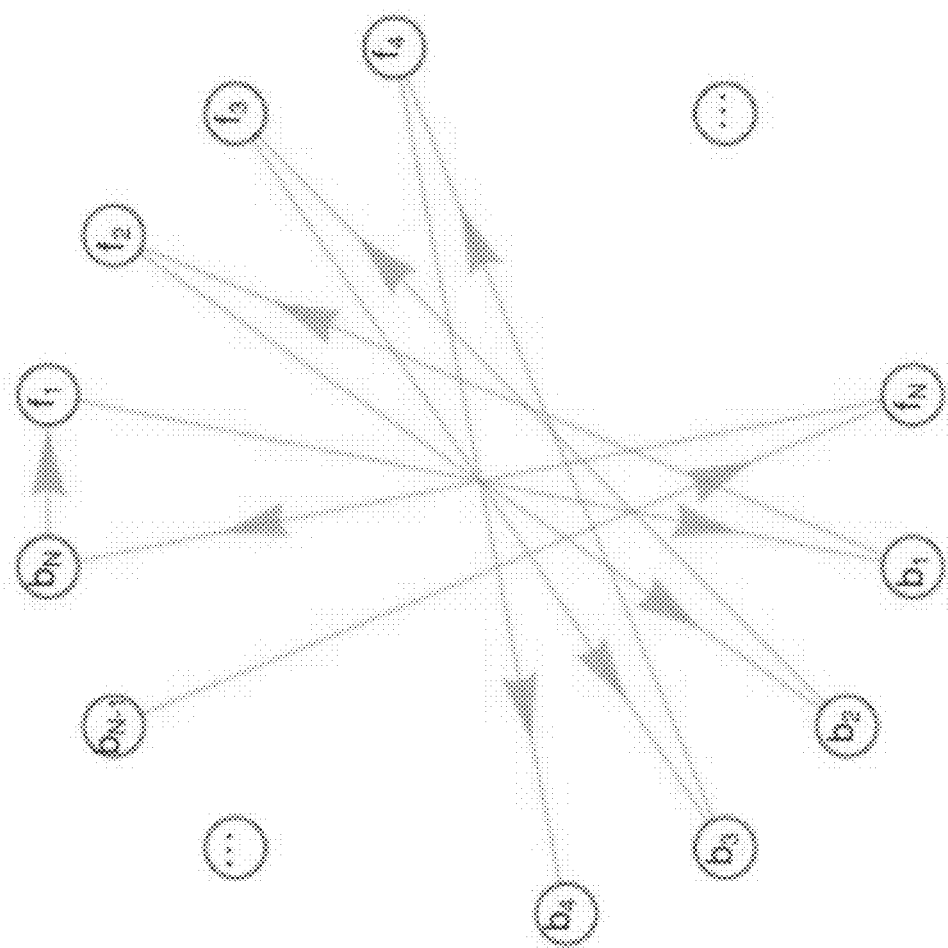
Figure 6C:
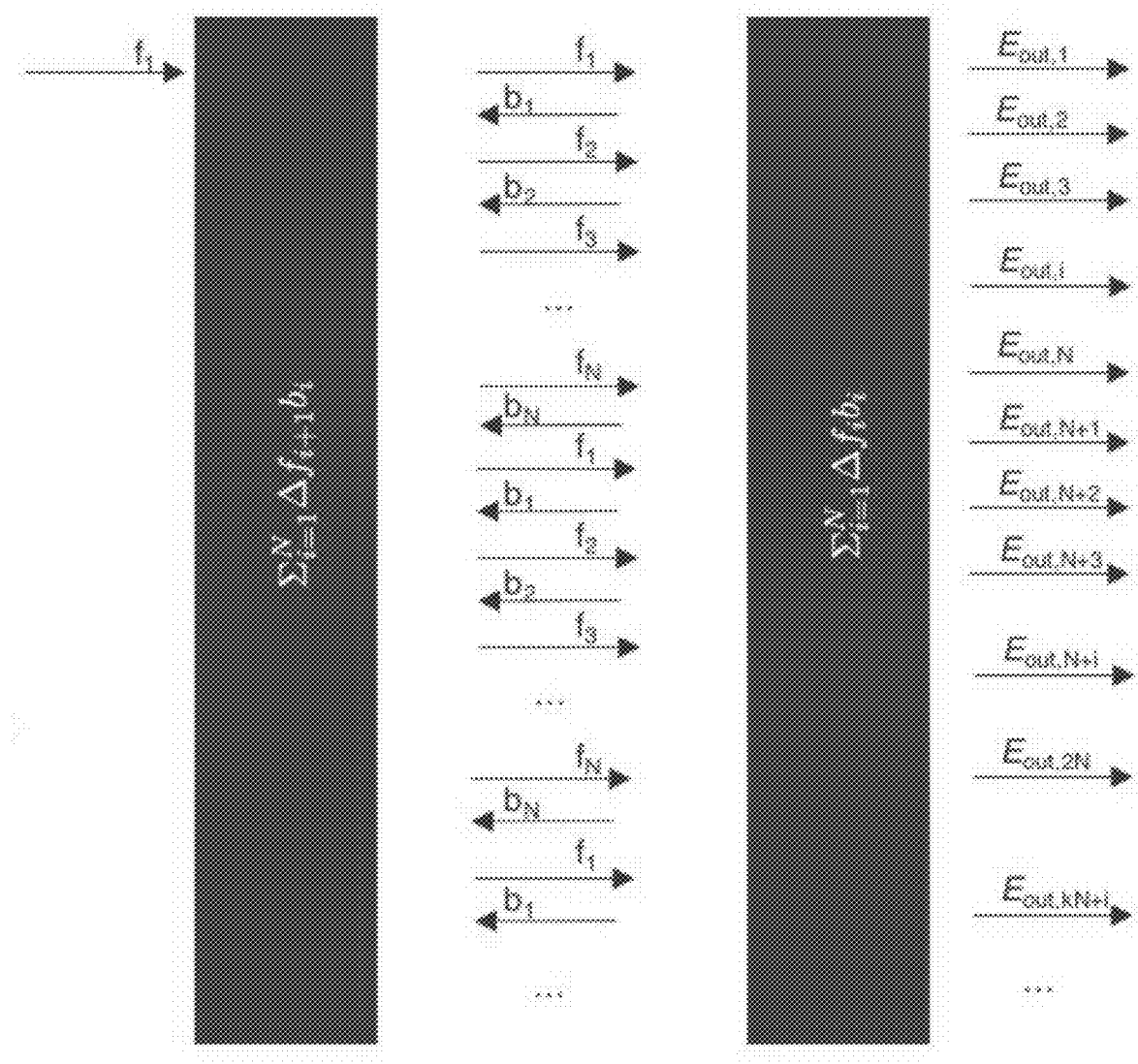

FIGS. 6A-6C illustrate a derivation of the transmission spectrum of a cascaded-mode resonator. FIG. 6A illustrates a compact representation of the mode conversions in the resonator. The modes can be renumbered in the order that they appear in the chain, where N forward propagating modes ($f_i$) can be distinguished from N backward propagating modes ($b_i$). According to this nomenclature, the left and the right reflector implement $\Sigma_{i=1}^{N} \Delta f_{i+1} b_i$ and $\Sigma_{i=1}^{N} \Delta f_{i+1} b_i$, respectively. Here, $f_{N+1} = f_1$ can be assumed. FIG. 6B illustrates a graph representation of the general resonator, defined in FIG. 6A. FIG. 6C illustrates a visualization of the partially transmitted fields at the right-hand side of the resonator. The total transmitted field can be the infinite sum of all these partially transmitted fields. This sum can be given by Equation 20.

This picture can continue until the last forward propagating mode in the system is reached, which can give rise to the Nth partially transmitted field given by Equation 13 for example:

$$\vec{E}_{out,N} = t_{pt_N} e^{i\phi_N} E_{in} \vec{u}_{f_N} \tag{13}$$

After the Nth wave has been partially transmitted, the whole cascade can be completed and the cascade can start again. For each mode transmitted, the following Equation can be fulfilled:

$$\vec{E}_{out,kn+i} = (r_{rt} e^{i\Delta\phi})^k \vec{E}_{out,i} \tag{14}$$

where i varies between 1 and N and k is an integer number keeping track of the number of full round trips that have been completed.

Here, the round-trip phase shift $\Delta_\phi$ can be retrieved and the parameter $r_{rt}$ can be introduced as shown in Equation 15 for example:

$$r_{rt} = \prod_{i=1}^{M} r_{i,i+1} \tag{15}$$

where M is the total number of mode conversions in one full round trip.

The total transmitted field through the resonator, for a given incident field $\vec{E}_{in}$ can include the sum of all the partially transmitted fields, mathematically taking the sum up to infinity as shown in Equation 16, Equation 17, Equation 18, and Equation 19 for example:

$$\vec{E}_{out} = \lim_{m \to \infty} \sum_{j=1}^{m} \vec{E}_{out,j} \tag{16}$$

$$\vec{E}_{out} = \lim_{n \to \infty} \sum_{k=0}^{n} \sum_{i=1}^{N} \vec{E}_{out,k,N+i} \tag{17}$$

$$\vec{E}_{out} = \lim_{n \to \infty} \sum_{i=1}^{N} \sum_{k=0}^{n} \vec{E}_{out,k,N+i} \tag{18}$$

$$\vec{E}_{out} = \sum_{i=1}^{N} t_{pt_i} \vec{u}_{f_i} e^{i\phi_i} E_{in} \lim_{n \to \infty} \sum_{k=0}^{n} (r_{rt} e^{i\Delta\phi})^k \tag{19}$$

This last sum is a geometric series. In closed form it can be rewritten as $(1 - r_{rt} e^{i\Delta\phi})^{-1}$. The total transmitted field is shown by Equation 20 for example:

$$\vec{E}_{out} = \sum_{i=1}^{N} \frac{t_{tp_i} e^{i\phi_i}}{1 - r_{rt} e^{i\Delta\phi}} E_{in} \vec{u}_{f_i} \quad (20)$$

In general, for a given incident field, the output can be a sum of different forward propagating modes, whose amplitudes are given by the different $t_{pt,i}$. The different modes can follow the same spectrum, defined by the round-trip reflection efficiency $r_{rt}$ and the round-trip loss $\Delta_\phi$.

For each of the output modes, the transmitted intensity can be calculated. Defining $t_i = E_{out,i}/E_{in}$ and $\vec{t}_{pt,i} = t_{pt_i} \vec{u}_i$, with $\vec{u}_i$ unit vector of output mode i, Equation 21, Equation 22, Equation 23, Equation 24, and Equation 25 can be given for example:

$$T_i = t_i^* t_i \quad (21)$$

$$T_i = \frac{t_{pt_i}^* t_{pt_i}}{(1 - r_{rt} e^{i\Delta\phi})(1 - r_{rt} e^{-i\Delta\phi})} \quad (22)$$

$$T_i = \frac{|t_{pt,i}|^2}{1 - 2r_{rt}\cos(\Delta\phi) + r_{rt}^2} \quad (23)$$

$$T_i = \frac{|t_{pt,i}|^2}{(1 - r_{rt})^2 + 4r_{rt}\sin^2(\Delta\phi/2)} \quad (24)$$

$$T_i = \frac{\alpha_i}{1 + F\sin^2(\Delta\phi/2)} \quad (25)$$

Where a generalized definition of the finesse $F = 4r_{rt}/(1-r_{rt})^2$ can be retrieved and the normalized outgoing intensity amplitude for mode i: $\alpha_i = |t_{tp_i}|^2(1-r_{rt})^2$ can be defined.

Figure 7B:
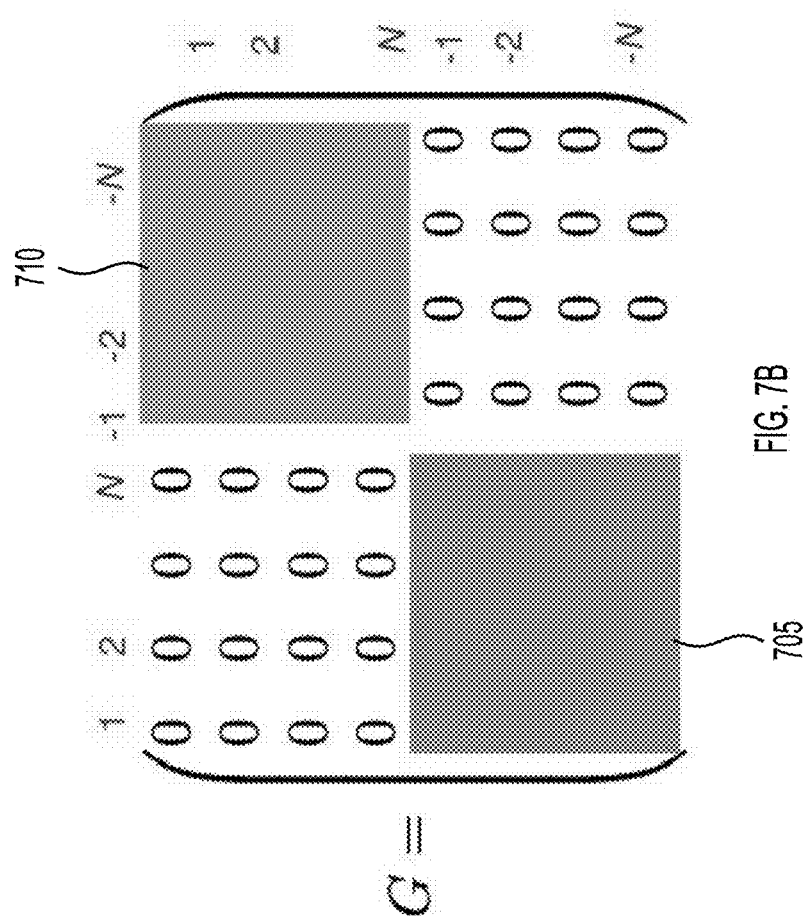
FIGS. 7A-7D illustrate a directed graph representation of a general cascaded-mode resonator, according to an example embodiment.
Figure 7A:
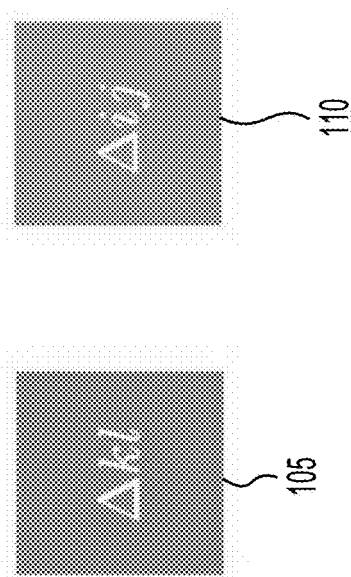
Figures 7C, 7D:
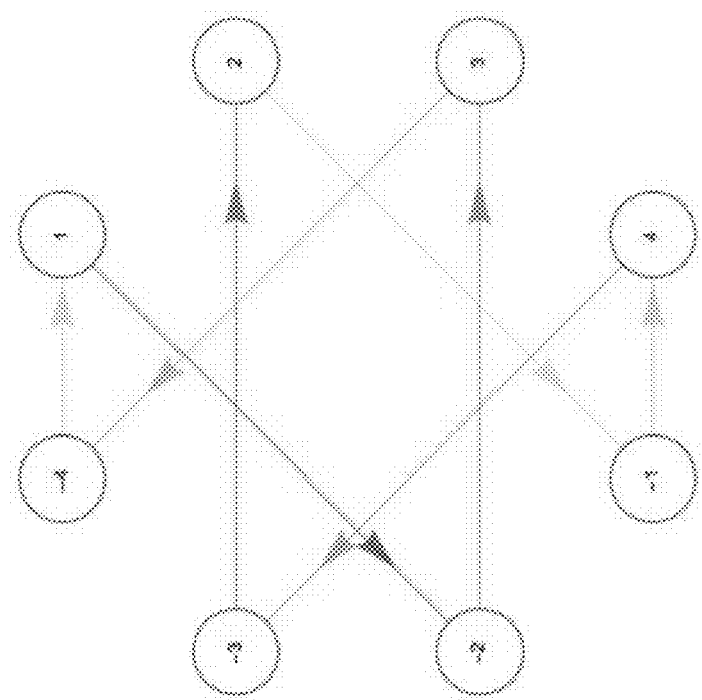

FIGS. 7A-7D illustrate a directed graph representation of a general cascaded-mode resonator. FIG. 7A illustrates a schematic of the mode conversions in a cascaded-mode resonator. FIG. 7B illustrates the adjacency matrix of the cascaded mode resonator shown in FIG. 7A, which can include two symmetric submatrices that correspond to the left and right mode converters. FIG. 7C illustrates an example of a graph in a four-mode system where the left and right converter implement $\Delta 23 + \Delta 14$ and $\Delta 12 + \Delta 34$, respectively. FIG. 7D illustrates the adjacency matrix of the system shown in FIG. 7C.

The relationship between the resonators, the mode converters, and the directed graphs can be described in more detail. As shown in FIG. 7A, cascaded-mode resonators can include two sets of converters that convert forward propagating modes into backward propagating modes and vice-versa. The directed graph of a cascaded-mode resonator can be constructed by associating each mode with a node and each mode-converter with an edge between the nodes. In doing so, the forward and backward propagating modes can be disambiguated. Since there are no conversions between forward propagating modes or backward propagating modes, this procedure can result in constructing a bipartite graph. The graph can be directed since the mode conversions occur at one end of the resonator, and both ends of the resonator are not necessarily identical.

The general form of the adjacency matrix is shown in FIG. 7B. The action of the converters at both ends of the resonator can be visible as separate submatrices in this matrix. The first mode converter 105 can correspond to a first submatrix 705. The second mode converter 110 can correspond to a second submatrix 710. The internal symmetry of the adjacency matrix can include a subtlety. Since both mode converters can be significantly different for one another, the adjacency matrix may not be symmetric. However, the mode converters themselves can be generally symmetric. For example, if a converter converts mode i to mode −j, it can also converts mode j to mode −i. Therefore, the submatrices that implement the two converters can be symmetric matrices.

FIGS. 7C and 7D illustrate the graph of a cascaded-mode resonator where the right-hand converter (e.g., second mode converter 110) includes $\Delta 12 + \Delta 34$ and the left-hand converter (e.g., first mode converter 105) includes $\Delta 23 + \Delta 14$. The graph is shown in FIG. 7C, where each mode conversion is represented by the lines (e.g., edges) connecting the vertices (e.g., circles). In FIG. 7D, the adjacency matrix corresponding to the graph shown in FIG. 7C is shown where each box element corresponds to an edge in the graph.

Figures 8A, 8B, 8C:
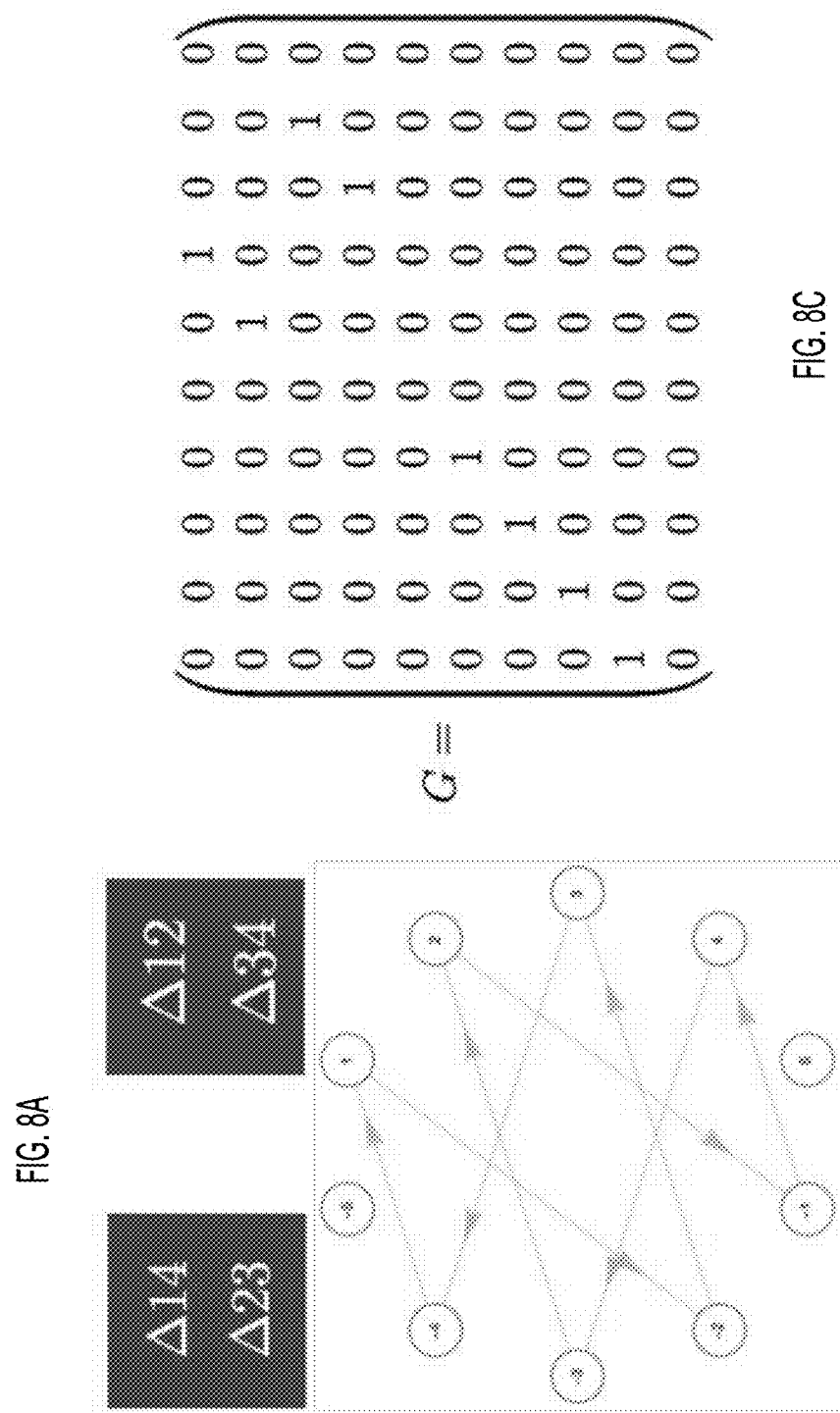

In FIGS. 8A-8I, the directed graph and the adjacency matrix of three different implementations of cascaded-mode resonators is shown. In FIGS. 8A-8C, an implementation with N=4 and $\xi=1$ is shown. In FIGS. 8D-8F, an implementation with N=4 and $\xi=2$ is shown. In FIGS. 8G-8I, a resonator that simultaneously contains two different types of resonances, N=4, $\xi=1$ and N=1, $\xi=2$, is shown.

Figure 9A:
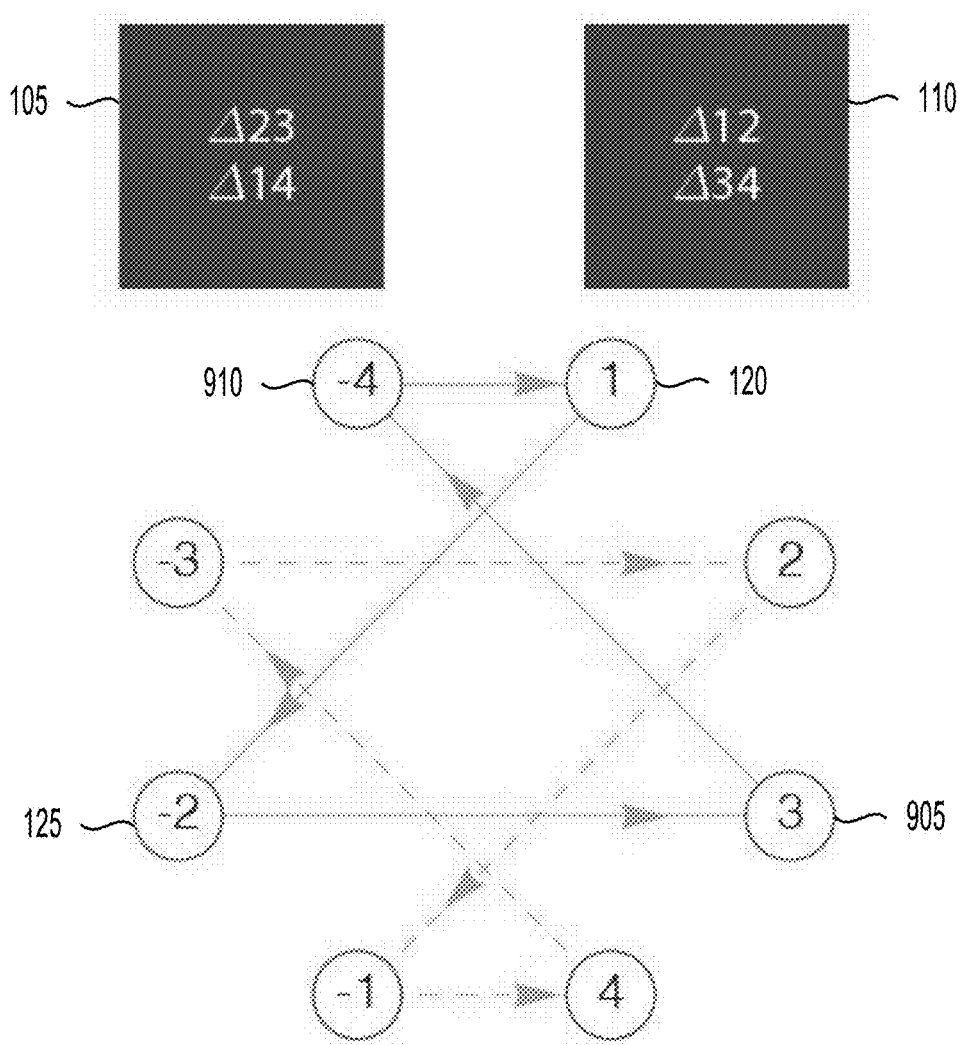
FIGS. 9A and 9B illustrate directed graph representations to analyze mode-independent resonances in cascaded-mode resonators, according to an example embodiment.
Figure 9B:
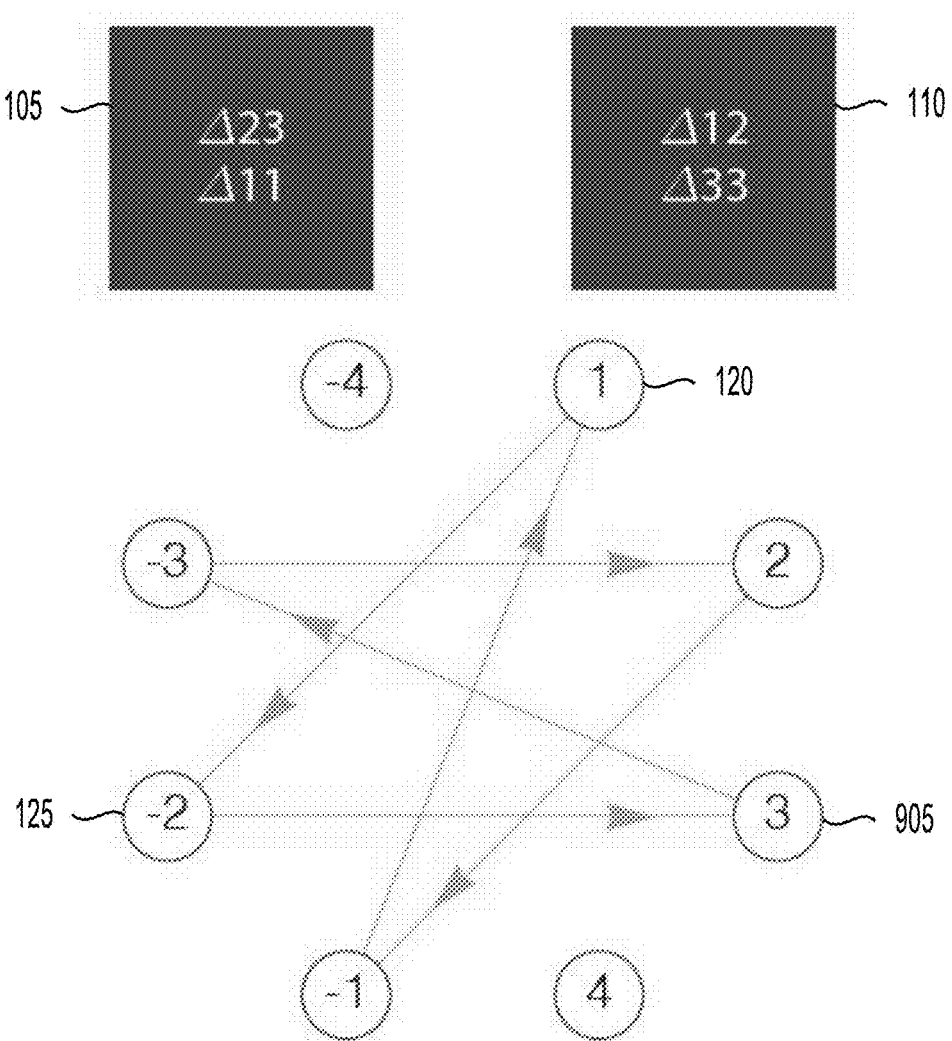

There can be different ways in which mode-independent resonances can appear in a cascaded-mode resonator. These ways can be understood by looking at the graph representation of the resonator, as shown in FIGS. 9A and 9B. FIGS. 9A and 9B illustrate directed graph representations to analyze mode-independent resonances in cascaded-mode resonators. Resonances can be represented and/or shown as the loops in the directed graph. To identify the mode-independent resonances, the different loops can be written out as a sequence of the vertices.

Mode-independent resonances can then occur within one loop or between two different loops. First, within one loop, the different nodes of the sequence can all contribute to the same supermode. The resonator can thus experience mode-independent resonances for each of these modes as inputs. In addition, also two different loops can give rise to the same resonance. This can be the case if the sequence of one loop can be turned into the sequence of the other by inversion of the nodes and reversing the direction of the sequence.

In the case of FIG. 9A, there are two loops in the graph: $\{1, -2, 3, -4\}$ (solid lines) and $\{4, -3, 2, -1\}$ (dashed lines). These loops are identical after inverting the nodes and reversing the sequence of one the loops. The top image of FIG. 9A illustrates a cascaded-mode resonator that couples four modes, where each mode appears only once in the resonance (N=4, $\xi=1$). The middle image of FIG. 9A illustrates the corresponding graph of the resonator contains two cycles. The two cycles (solid lines, dashed lines) can exist because of the symmetry of the mode converters: if the edge i→−j exists, then the edge j→−j also exists. The bottom image of FIG. 9A illustrates the adjacency matrix of the graph ($G_1$) and the adjacency matrix raised to the power 4, $(G_1)^4$. The adjacency matrix raised to the power N is a diagonal matrix, illustrating that a node is mapped back onto itself after a path of length N, or a cycle of length N exists in the graph. Each row with a non-zero element on the diagonal is the input of a mode-independent resonance.

In some embodiments, the first mode converter 105 can convert the wave from the second mode 125 of the plurality of orthogonal modes to a third mode 905 of the plurality of orthogonal modes. The second mode converter 110 can convert the wave from the third mode 905 of the plurality of orthogonal modes to a fourth mode 910 of the plurality of orthogonal modes. The first mode converter 105 can convert the wave from the fourth mode 910 of the plurality of orthogonal modes to the first mode 120 of the plurality of orthogonal modes.

In FIG. 9B, there are mode-independent resonances for input 1, input 2, and input 3: indeed, {1, −2, 3, −3, 2, −1} is equivalent to {2, −1, 1, −2, 3, −3} and {3, −3, 2,−1, 1,−2}. FIG. 9B illustrates a cascaded-mode resonator with three coupled modes, each appearing twice in the resonance (N=3, ξ=2). The adjacency matrix (G2) is diagonalized after raising the matrix to the power 6 (=ξN). The different ways in which mode-independent resonances can appear in a cascaded-mode resonator correspond to the parameter being 1, in FIG. 0A, or 2, in FIG. 9B.

In some embodiments, the first mode converter 105 can convert the wave from the second mode 125 of the plurality of orthogonal modes to the third mode 905 of the plurality of orthogonal modes. The second mode converter 110 can reflect the wave with the third mode 905 of the plurality of orthogonal modes towards the first mode converter 105. The first mode converter 105 can convert the wave from the third mode 905 of the plurality of orthogonal modes to the second mode 125 of the plurality of orthogonal mode. The second mode converter 110 can convert the wave from the second mode 125 of the plurality of orthogonal modes to the first mode 120 of the plurality of orthogonal modes. The first mode converter 105 can reflect the wave with the first mode 120 of the plurality of orthogonal modes towards the second mode converter 110.

The different modes that activate the same supermode can also be retrieved from the graph's adjacency matrix. For example, when the adjacency matrix raised to a power k is partially diagonalized, all the rows corresponding to the same eigenvalue can be inputs to the same mode-independent resonance, as shown in FIGS. 9A and 9B.

Table 1 illustrates a summary of scaling of spectral properties in cascaded-mode resonators:

| Spectral Parameter | Traditional Resonator (tr) | Cascaded-Mode Resonator (CM) |
|---|---|---|
| Fundamental mode wavelength | $\lambda_{max, tr}$ | $\lambda_{max, CM} = \lambda_{max, tr} N$ |
| Free spectral range | $\Delta v_{tr}$ | $\Delta v_{CM} = \Delta_{tr}/N$ |
| Resonance linewidth | $\Delta \gamma_{tr}$ | $\Delta_{\gamma CM}/N$ |
| Quality factor | $Q_{tr}$ | $Q_{CM} = Q_{tr} N$ |
| Cavity ring-down time | $\tau_{tr}$ | $\tau_{CM} = \tau_{tr} N$ |
| Intracavity power build-up | $K_{tr}$ | $\kappa_{CM} = \kappa_{tr} N$ |

The integrated photonic circuit structures can be fabricated using silicon-on-insulator (SOI) fabrication techniques. Starting from an SOI wafer with a 2 μm buried oxide layer and a 220 nm silicon layer, electron-beam lithography can be performed with a 125 keV Elionix system using ZEP520A positive resist (spin-coating at 3000 rpm, pre-exposure bake 3 min at 90° C. and 3 min at 180° C.). After exposure, the photoresist can be developed in cold Oxylene for 60 s, and an oxygen plasma can be performed for 15 s at 40 sccm, 100 W. In a second step, the silicon layer can be etched using the resist as an etch mask by single-step reactive ion etching with fluorine chemistry ($SF_6$ and $C_4F_8$). The buried oxide layer can work as an etch stop layer. The remaining resist layer can then be removed by leaving the samples overnight in Remover PG at 80° C. A final cleaning process can be performed using Piranha etch for 15 s. Finally, a 700 nm thick cladding layer of silicon dioxide can be deposited via chemical vapor deposition.

Figure 10A:
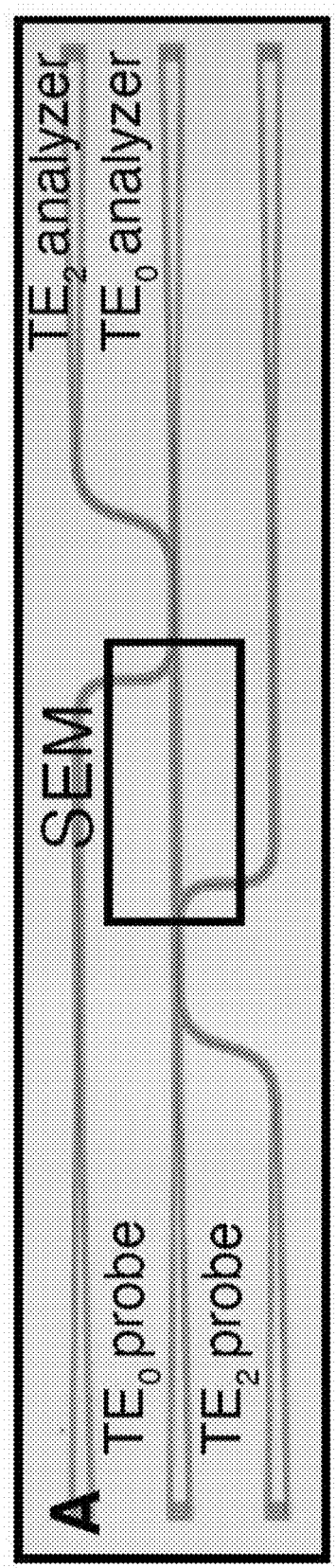
FIGS. 10A-10F illustrate images of fabricated resonators, according to an example embodiment.

FIGS. 10A-10F illustrate images of fabricated resonators (e.g., cascaded-mode resonators 100). A set of fabricated samples are shown in FIG. 10A by optical microscope and in FIGS. 10B-10D by scanning electron microscope. FIG. 10A illustrates one resonator structure together with waveguides that guide light of a well-defined optical mode ($TE_0$ or $TE_2$) into and out of the resonator, which is located in the center of the chip (marked by the rectangle labeled "SEM"). The spectral response of the resonator for a transverse mode of choice can be investigated. FIG. 10A illustrates an optical microscope picture of a fabricated resonator that features three waveguide inputs on the left and three waveguide outputs on the right. From these, two sets can be used to probe the resonator for input $TE_0$ and $TE_2$ modes and to analyze the output of the resonator also in these two transverse modes.

Figure 10B:
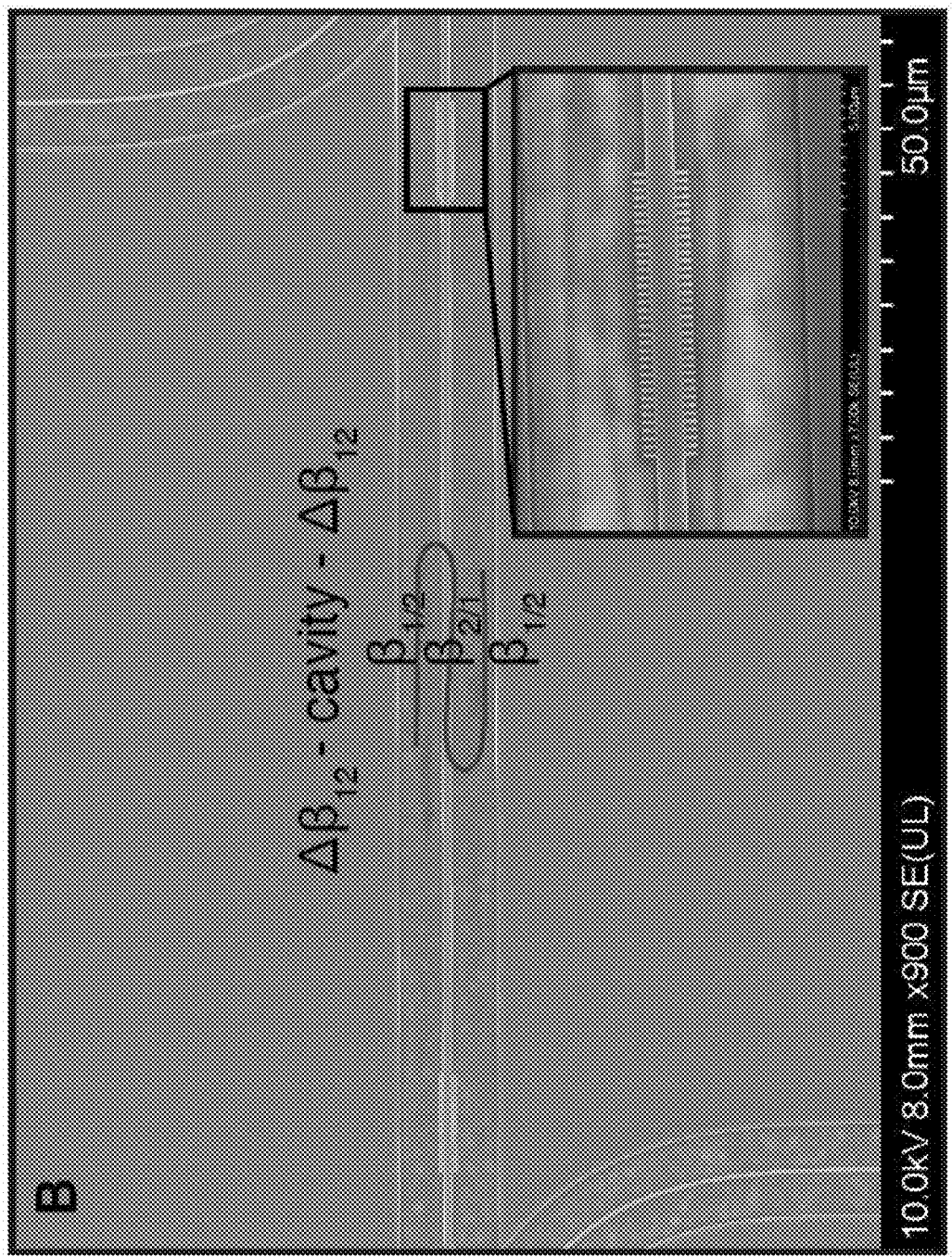
Figure 10C:
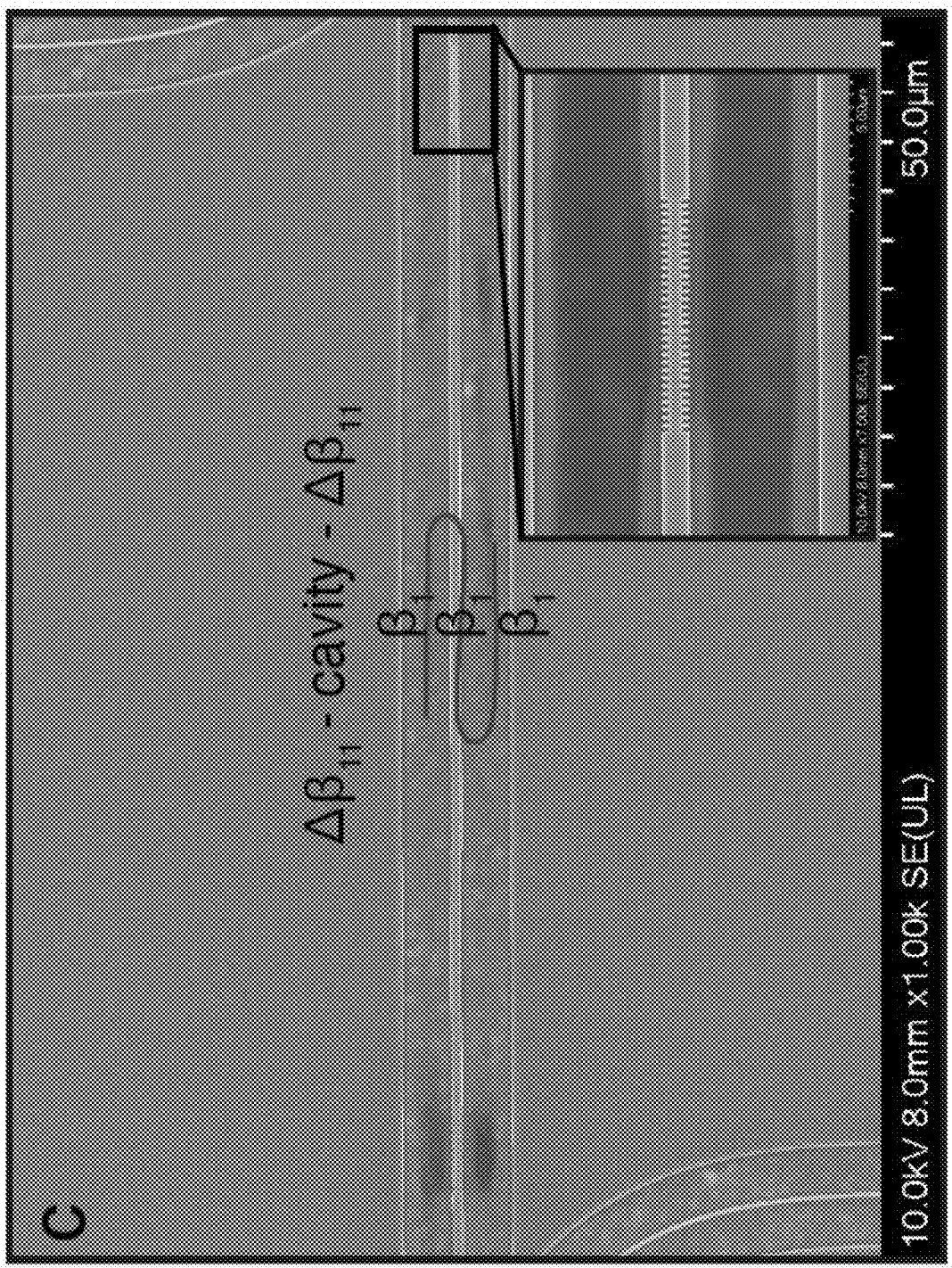
Figure 10D:
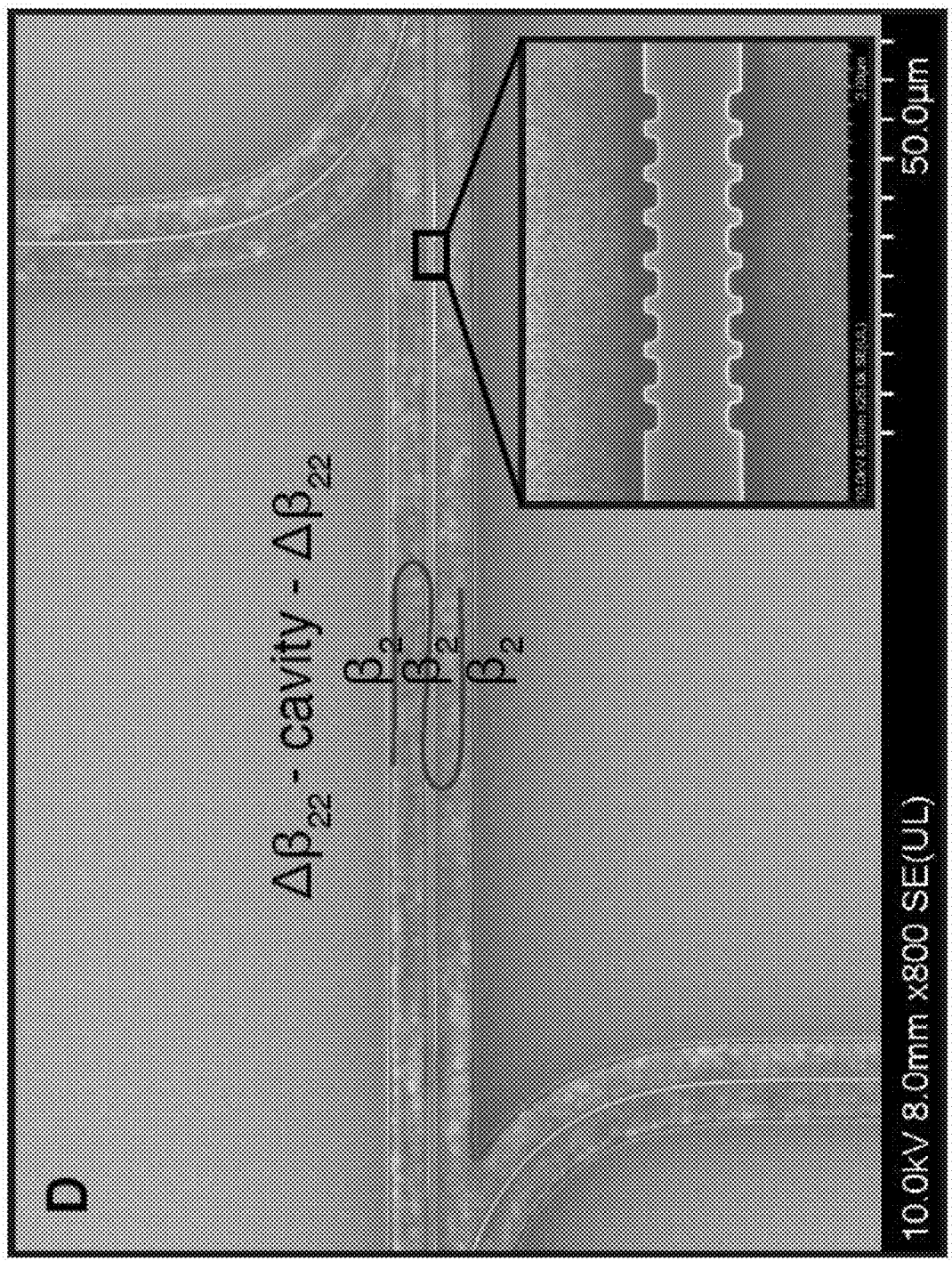

FIGS. 10B-10D illustrate SEM figures for three types of resonators and a close-up of the Bragg gratings is provided in each figure as an inset. The SEM images in FIGS. 10B-10D illustrate the marked area in the optical microscope image prior to the deposition of the silicon dioxide cladding layer for the three different types of resonators: the mode converting resonator as shown in FIG. 10B where upon each reflection at the Bragg mirror, $TE_0$ transverse modes are transformed into $TE_2$ modes, and vice-versa; a Fabry-Perot resonator as shown in FIG. 10C which provides selective reflection to the $TE_0$ transverse mode, and no mode conversion occurs; and a second Fabry-Perot resonator as shown in FIG. 10D which provides selective reflection to the $TE_2$ transverse mode, and no mode conversion occurs. Each SEM figure includes an inset that shows a close-up view of the mode converter alone. For each resonator, the two Bragg gratings are identical in the cases discussed.

Figure 10E:
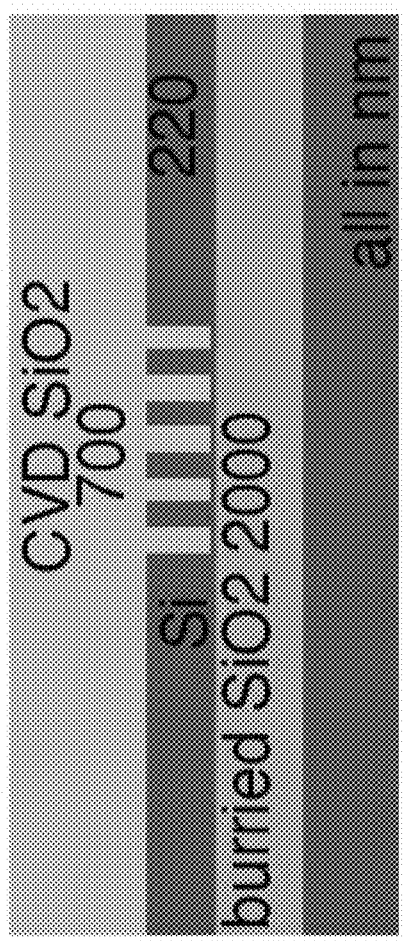

FIG. 10E illustrates a schematic of a cross-sectional view of the mode converters (e.g., Bragg reflectors). CVD=chemical vapor deposition, per=period, $SiO_2$=silicon dioxide, $\Delta\beta_{11}$=Bragg mirror that reflects selectively mode $TE_0$ into $TE_0$, $\Delta\beta_{12}$=Bragg mirror that reflects mode $TE_0$ into $TE_2$, and vice-versa, $\Delta\beta_{22}$=Bragg mirror that reflects selectively mode $TE_2$ into $TE_2$.

Figure 10F:
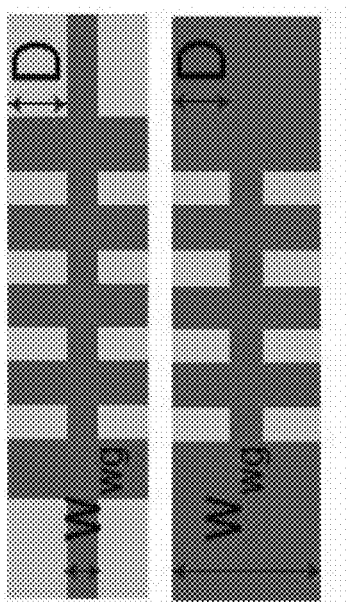

FIG. 10F illustrates a schematic of a top view of the mode converters and the main dimensions of the chip (per=period) shown in FIGS. 10B-10D. The periods are equal to per=313 in FIG. 10B, 304 in FIG. 10C, 480 nm in FIG. 10D, the duty cycle of all gratings is 40%, the width of the multimode waveguide is $w_{wg}$=1.07 μm, and the depth of the corrugations is D=506 in FIG. 10B, D=296 in FIGS. 10C, and D=149 nm in FIG. 10D.

The resonators can be characterized by transmission spectroscopy using a tunable Santec TSL-550 laser, having a linewidth of 200 kHz, which can be much below the linewidth of the resonances considered here. The polarization of the incident light can be adjusted using fiber polarizers to maximize the power transmitted through the chip. Cleaved fiber probes from Lightwave at an angle of 10° can be placed above the grating couplers located at the ends of the on-chip waveguides and light from the fiber to on-chip waveguides can be coupled into $TE_0$ mode (e.g., in-plane polarization). The transmitted power can be measured with an InGaAs photodiode with adjustable gain.

Lumerical FDTD Solutions (e.g., v8.21) can be used to simulate and design the mode converter gratings and the resonant cavity composed of them. In the simulations, the thickness of the device layer of the silicon can be 220 nm. The substrate can be silicon oxide. A layer of silicon oxide on top with a thickness of 700 nm can be applied to protect the silicon devices. The refractive index of the silicon and silicon oxide can be 3.46 and 1.46, respectively. The waveguide can have a width of 1100 nm, which can allow for the existence of guided modes of $TE_0$ and $TE_2$ around a wavelength of 1550 nm. The mesh size can be 25 nm.

The simulation of the contra-directional gratings that convert $TE_0$ into $TE_2$, and vice-versa, can be described The period, depth, duty cycle of the gratings used for converting a forward $TE_0$ mode to a backward propagating $TE_2$ mode (and vice versa) can include 316.5 nm, 500 nm, and 40%, respectively. The mode conversion efficiency can reach a maximum near 1550 nm wavelength. The sweeping range of wavelength and the grating number can include 1350 nm to 1750 nm and 1 to 50, respectively. The Mode Source Module in the Lumerical software can be used to solve the eigenmodes in the waveguide and select the $TE_0$ or $TE_2$ mode as the input light source into the mode converter gratings. The transmitted and reflected electromagnetic (EM) fields can be recorded after the 3D full-wave simulations. The mode expansions of the recorded EM fields can be performed to obtain the transmitted and reflected power of the $TE_0$ and $TE_2$ modes.

The simulation of the resonant cavity can be described. The resonant cavity can be formed by two sets of above mentioned mode converter gratings with a cavity length of 150 μm. The grating number of the mode converter can be chosen to be $N_{per}$=36 considering both a high mode conversion efficiency and reasonable bandwidth. The simulation time can be set to be 72 ps which can be long enough to get an accurate result.

Figures 11A, 11B:
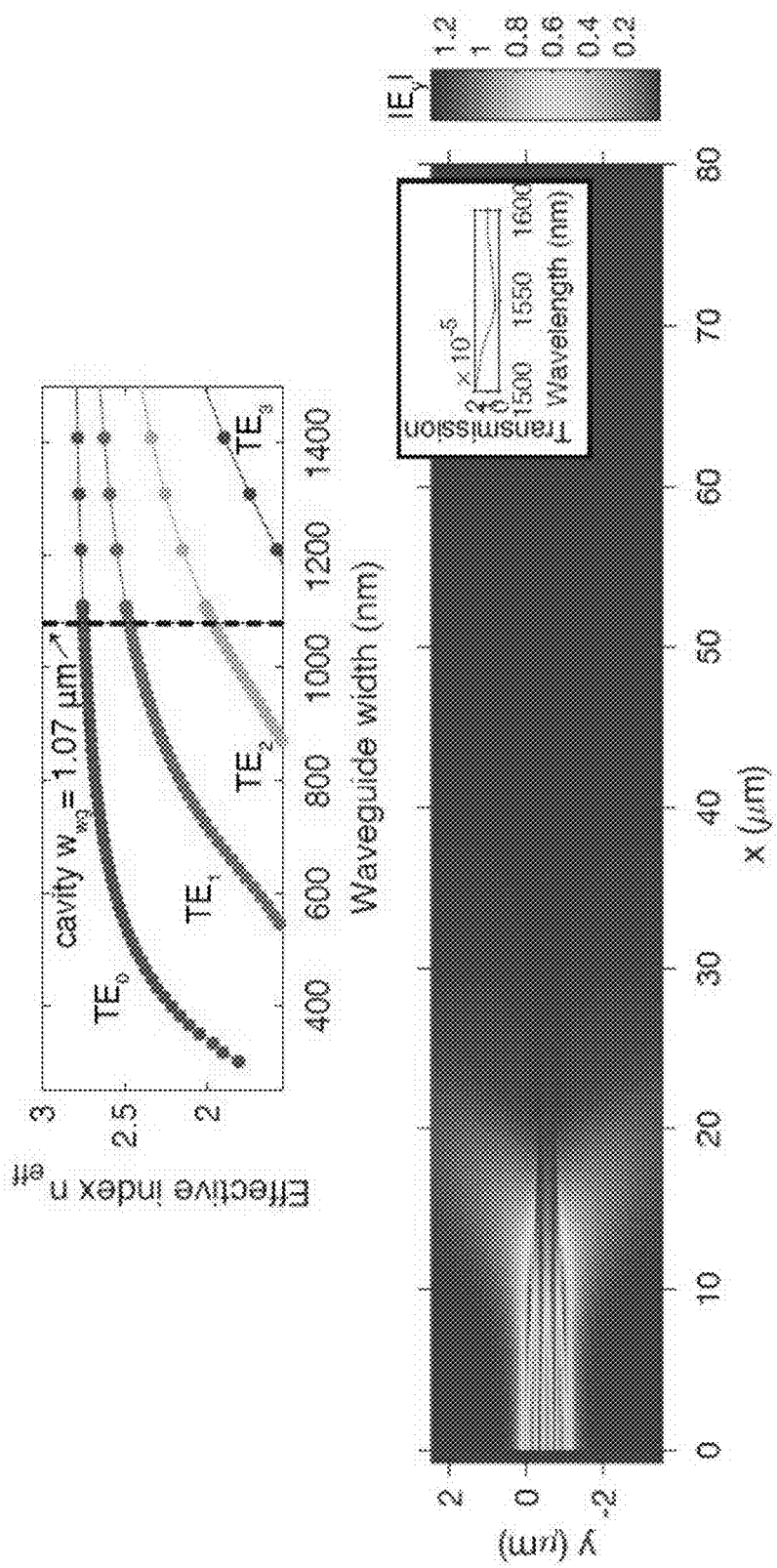
FIGS. 11A and 11B illustrate multimode waveguide properties, according to an example embodiment.

In FIGS. 5A-5B, resonator parameters (e.g., resonant wavelength, quality factor, group index) that were extracted from the experimentally measured transmission spectra were shown. The procedure to extract these parameters, which was applied to all data, can be elaborated upon. Lorentzian line shapes can be fitted to each longitudinal mode and the Lorentzian fit can be used to determine the resonant wavelength and the Q-factor. These were shown in FIGS. 5A and 5B. For the computation of the group index from the transmission spectra, an accurate estimation of the effective cavity length for each resonator can be used. The effective cavity length $L_{eff}=L_{wg}+2L_{Bragg}$ can account for the penetration of optical fields into the Bragg reflectors (e.g., summarized into an effective Bragg length $L_{Bragg}$), which adds to the geometrical length of the multimode waveguide $L_{wg}$. To determine $L_{Bragg}$ experimentally, in each case three separate resonators can be fabricated for each type of mode-converter, each with a length of the multimode waveguide of $L_{wg}$=100 μm, 150 μm and 200 μm. Since in all three cases, $L_{Bragg}$ is constant, it is possible to extract $L_{Bragg}$ from the free spectral range of the longitudinal modes at different waveguide lengths. $L_{Bragg}$ 4.3 μm, 6.15 μm and 0.5 μm for the mode-converting grating, the $TE_0$ Fabry Perot resonator and the $TE_2$ Fabry Perot resonator, respectively. By knowing the effective total cavity length, the group indices can be extracted from the spacing of adjacent longitudinal modes The multimode waveguide preceding the resonators, located in between the Bragg gratings and after the resonator can have a width of $w_{wg}$=1.07 μm. This width can be chosen as to maximize the difference between the effective indices of the $TE_0$ and $TE_2$, as to ensure a high selectivity of the three different Bragg mirrors we consider. The simulated effective indices of the modes are shown for various waveguide widths in FIG. 11A. Additionally, the $TE_3$ mode and all subsequent higher order modes may not be supported at this waveguide width. Furthermore, adiabatic tapers connected to single-mode waveguides of width 440 nm can be used to filter out any $TE_2$ mode from the $TE_0$ analyzer port. The efficiency of the taper and single-mode waveguide to achieve this filtering effect can be simulated using finite-time-domain methods and the resulting field distribution is shown in FIG. 11B. As visible from the inset, the transmission is below $10^{-5}$.

FIGS. 11A and 11B illustrate multimode waveguide properties. FIG. 11A illustrates dispersion curves of the effective indices of transverse modes $TE_i$ as a function of waveguide width. FIG. 11B illustrates a simulation of transmitted electric field of mode $TE_2$ through the adiabatic taper reveals a transmission below $10^{-5}$.

Figure 12:
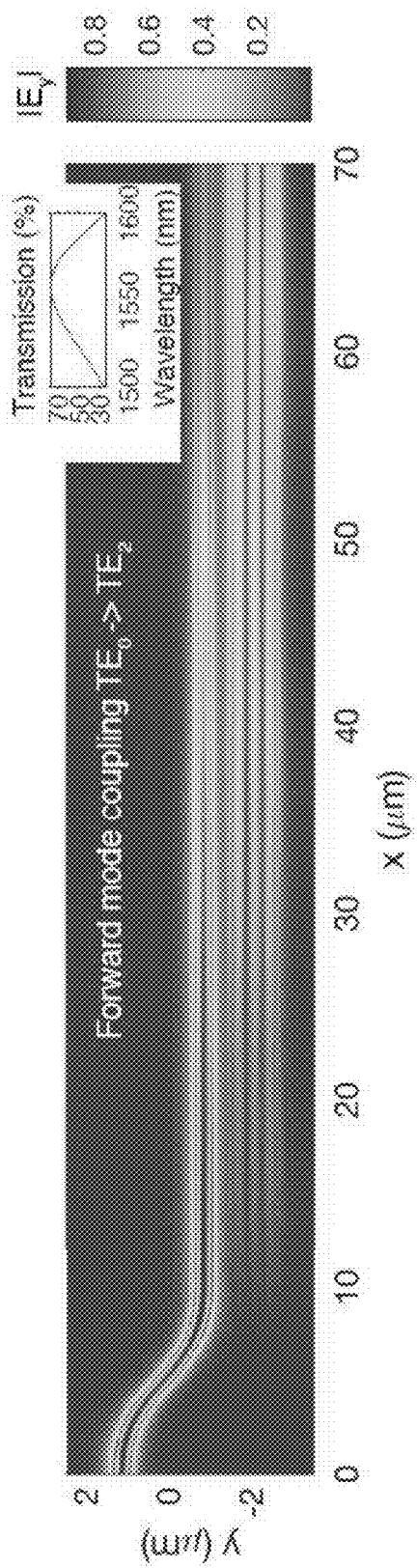
FIG. 12 illustrates co-directional waveguide coupler properties, according to an example embodiment.

To probe and analyze the resonator properties under an incident $TE_2$, a co-directional mode converter can be designed based on the evanescent coupling of a nanowaveguide and a multimode waveguide shown in FIG. 12. For the conversion to be efficient, the effective index of the $TE_0$ mode in the narrow waveguide can match the effective index of the $TE_2$ mode in the multimode waveguide. In this situation, the propagation constants of the two modes can be equal and coherent injection of mode $TE_2$ from $TE_0$ can be ensured. Graphically, this can corresponds to horizontal lines in the plot of FIG. 11A, and to a width of the nanowaveguide of 335 nm. From full-wave simulations, a coupling length of 70 μm as was used in the experiments, can be sufficient to couple 70% of the power into mode $TE_2$ around a central wavelength of 1550 nm.

FIG. 12 illustrates co-directional waveguide coupler properties. FIG. 12 illustrates a simulation of the adiabatic forward mode coupler that shows efficient energy transfer from the narrow single-mode waveguide populated with $TE_0$ to the wide multimode waveguide where $TE_2$ is parametrically generated. The inset shows a maximal transmission of 70%.

The design strategy of mode-converting and non-mode converting Bragg gratings can be described. For these gratings to fulfill their intended purpose, several conditions can be satisfied concomitantly: (1) all gratings provide selective and efficient reflection for a pre-selected transverse mode profile, (2) all gratings provide only minimal reflection to all other transverse mode profiles, and (3) all gratings effect only negligible co-directional mode conversion. These conditions can be fulfilled by careful choice of the effective refractive index of the transverse modes supported by the waveguide. In general, a Bragg grating can provide an additional momentum that can be leveraged to achieve phase matching for a given set of modes. For contra-directional coupling of modes with propagation constants $$\beta_1 = n_{eff,1}\frac{w}{c_0}, \text{ and}$$

$$\beta_2 = n_{eff,2}\frac{w}{c_0}$$

(corresponding to mode-converting Bragg mirrors), the grating period Λ can be chosen such that $$\frac{2\pi}{\Lambda} = \beta_1 - \beta_2.$$

For co-directional coupling, the grating period Λ can be chosen such that $$\frac{2\pi}{\Lambda} = \beta_1 - \beta_2.$$

The corresponding grating periods can be considerably distinct. The co-directional coupling can be negligible when contra-directional coupling is achieved. For contra-directional coupling of modes with equal propagation constants $$\beta_1 = n_{eff,1}\frac{w}{c_0}, \text{ or}$$

$$\beta_2 = n_{eff,2}\frac{w}{c_0}$$

(corresponding to mode-converting Bragg mirrors), the grating period A can be chosen such that $$\frac{2\pi}{\Lambda} = 2\beta_1 \text{ or } 2\beta_2$$

(corresponding to non-mode converting Bragg mirrors). Having chosen the two modes $TE_0$ and $TE_2$ to have maximally different effective refractive indices, it is possible to choose a grating period that achieves only mode-converting reflection and negligible standard reflection, or vice-versa.

Figure 13A:
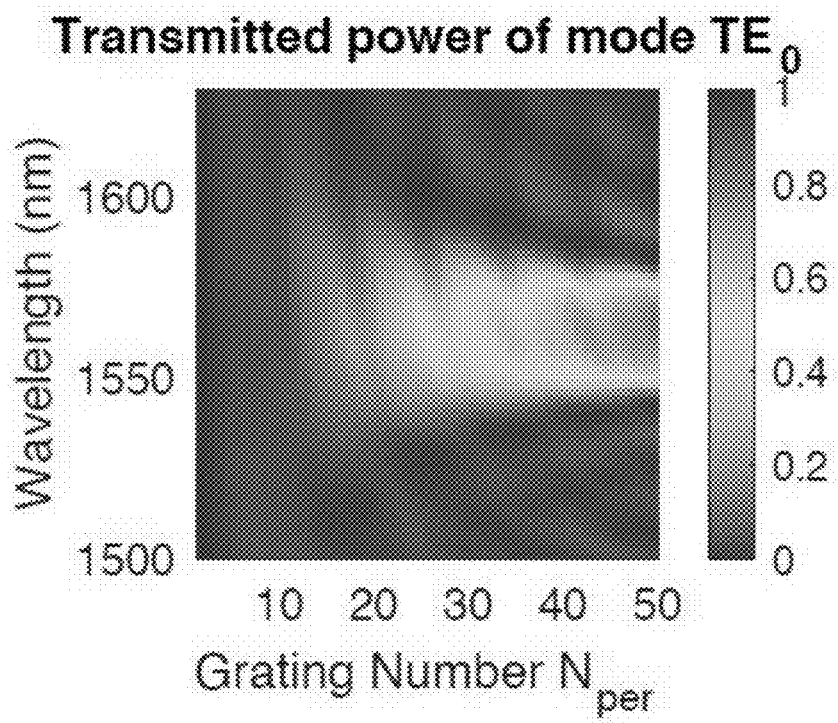
FIGS. 13A-13D illustrate contra-directional mode-converting grating properties under an incident $TE_0$ mode, according to an example embodiment.
Figure 13B:
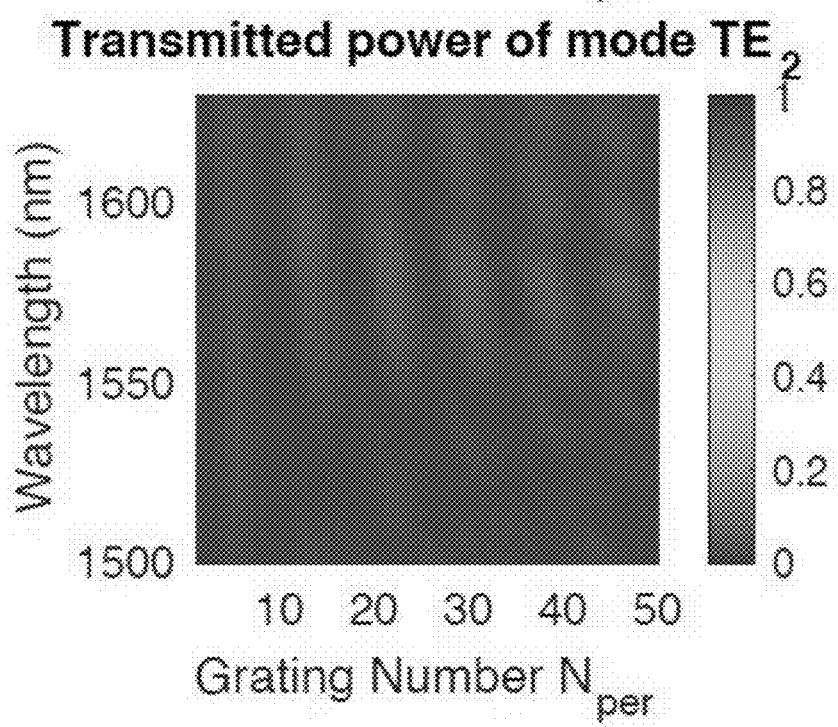
Figure 13C:
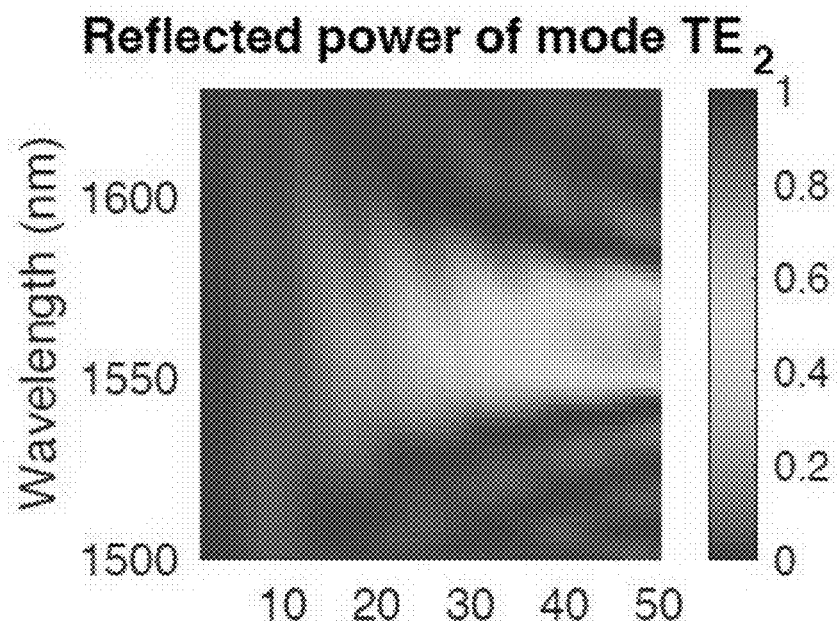
Figure 13D:
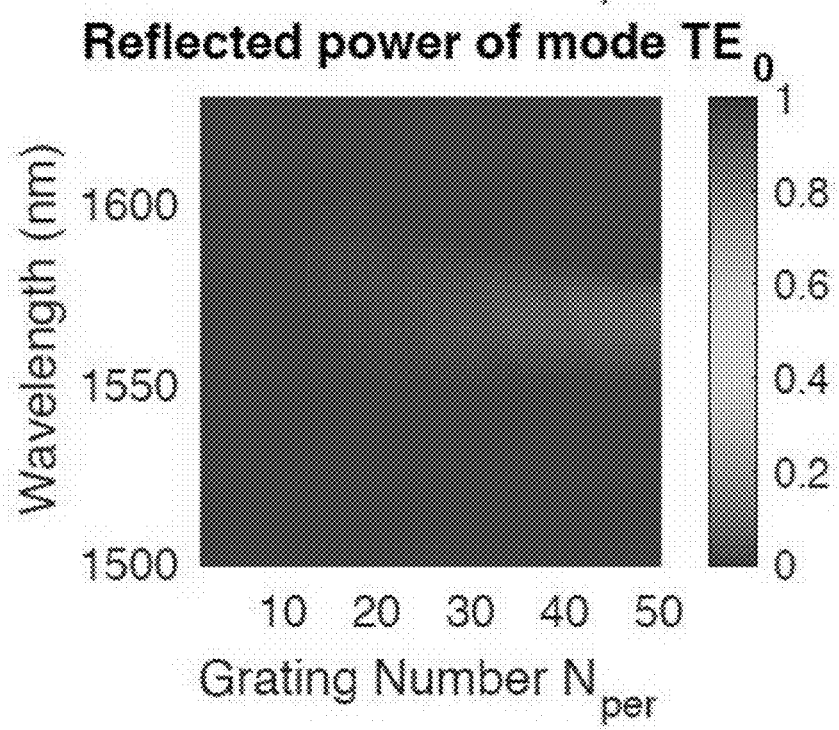

FIGS. 13A-13D illustrate the simulated reflection and transmission properties of the mode converting grating with parameters as described above (e.g., contra-directional mode-converting grating properties), under an incident $TE_0$ mode. An efficient mode conversion can be provided by the grating around 1560 nm, and that reflection into the same mode can be negligible. Furthermore, with an increasing number of grating periods, the reflected power at the grating can increase. FIGS. 13A and 13B illustrate transmitted power into mode $TE_0$ and $TE_2$. FIGS. 13C and 13D illustrate reflected power into mode $TE_0$ and $TE_2$. Overall, these graphs can demonstrate an efficient and selective conversion from input mode $TE_0$ into an output mode with transverse profile $TE_2$, and that this conversion is efficient in a reflection geometry around 1560 nm. Furthermore, the Bragg grating can reflect back into the same mode $TE_0$ only minimally, and also the co-directional conversion can be negligible. Furthermore, as the number of grating periods increases, the reflected power can also increase. A number of periods $N_{per}=36$ can be chosen.

Figures 14A, 14B:
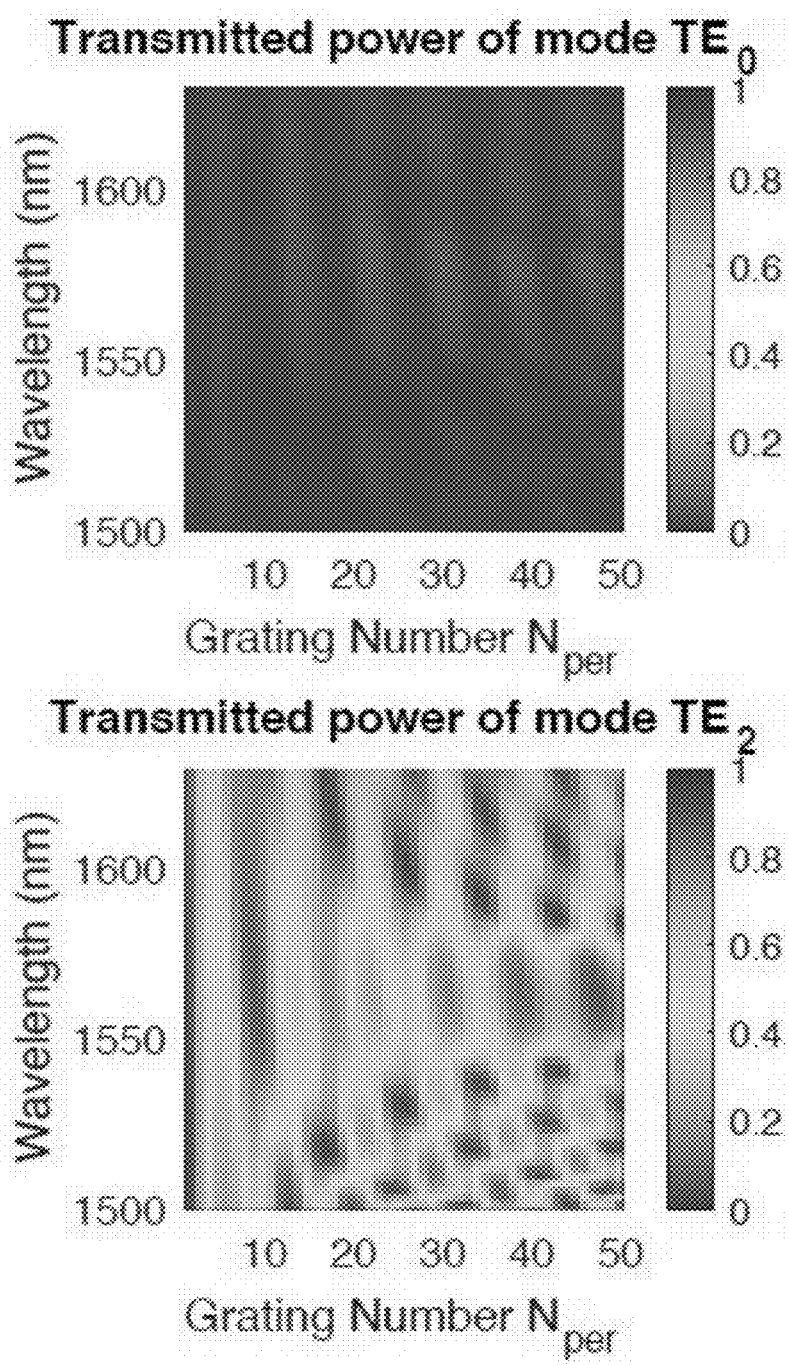
FIGS. 14A-14D illustrate contra-directional mode-converting grating properties under an incident $TE_2$ mode, according to an example embodiment.
Figures 14C, 14D:
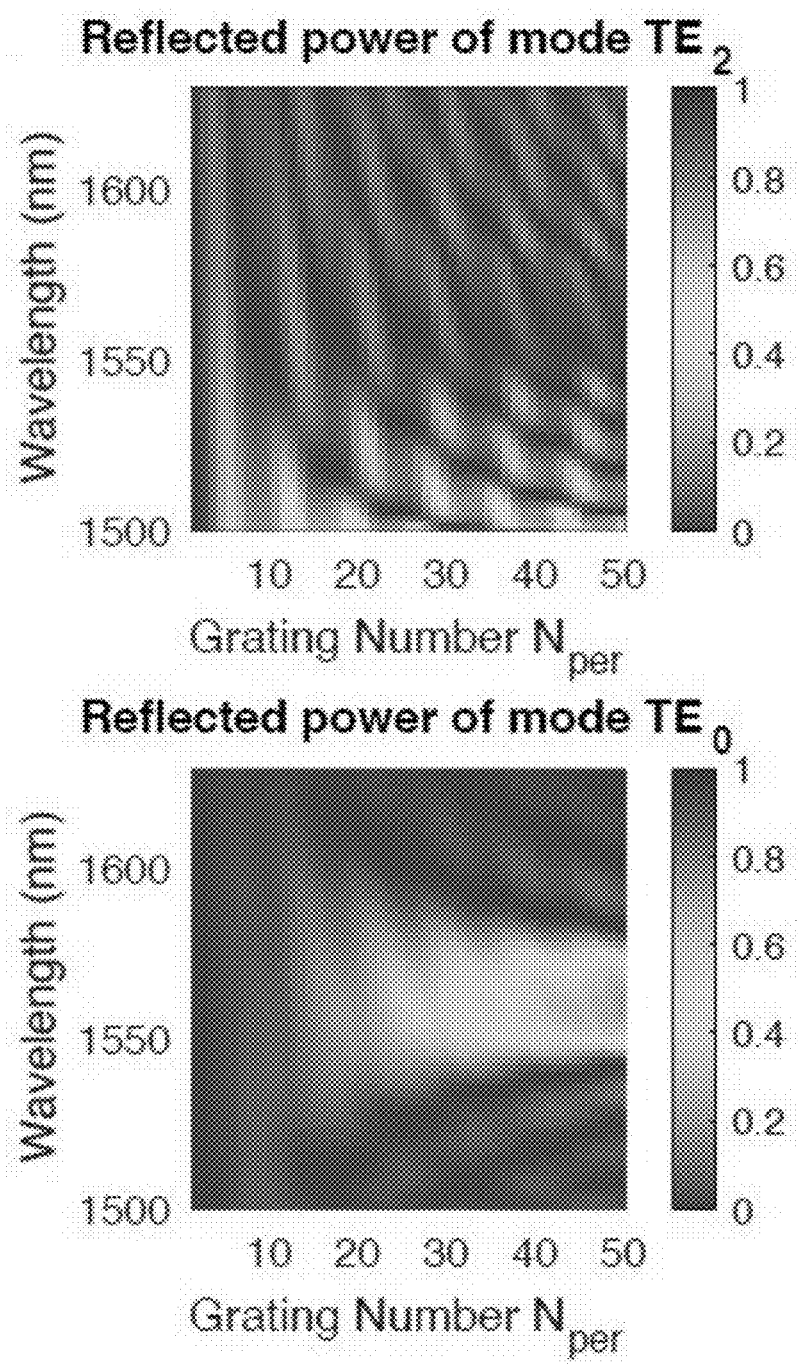

FIGS. 14A-14D illustrate the simulated reflection and transmission properties of the mode converting grating with parameters as described above (e.g., contra-directional mode-converting grating properties), under an incident $TE_2$ mode. An efficient mode conversion can be provided by the grating around 1560 nm, and that reflection into the same mode can be negligible. Furthermore, with an increasing number of grating periods, the reflected power at the grating can increase. By comparing FIG. 13C with FIG. 14D, the reciprocal behavior of the mode converters can be observed. FIGS. 14A and 14B illustrate transmitted power into mode $TE_0$ and $TE_2$. FIGS. 14C and 14C illustrate reflected power into mode $TE_0$ and $TE_2$. Overall, these graphs can demonstrate an efficient and selective conversion from input mode $TE_2$ into the output mode with transverse profile $TE_0$, and that this conversion is efficient in a reflection geometry around 1560 nm. Furthermore, the Bragg grating can reflect back into the same mode $TE_2$ only minimally, and also the co-directional conversion can be negligible. Furthermore, as the number of grating periods increases, the reflected power can also increase. A number of periods $N_{per}=36$ can be chosen.

Figure 15A:
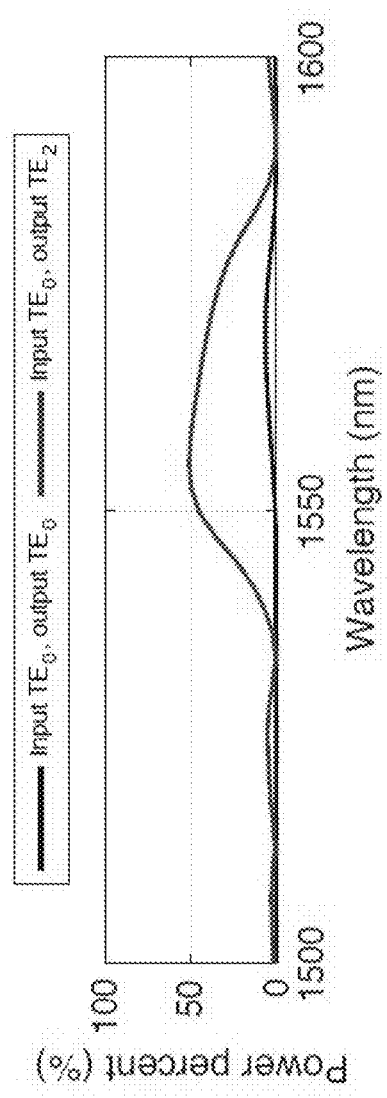
FIG. 15A illustrates the reflection curves for a mode-converting Bragg grating, according to an example embodiment.
Figure 15A:
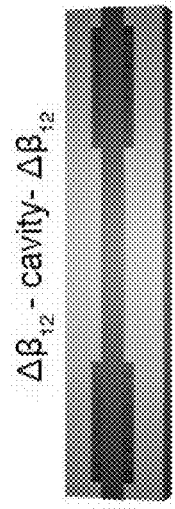
Figure 15B:
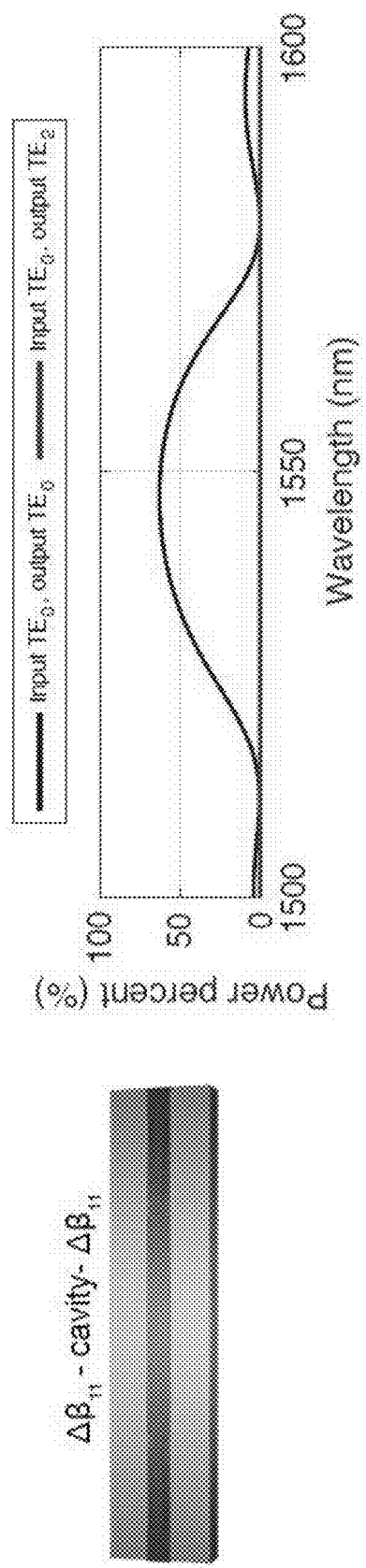
FIG. 15B illustrates the reflection curves for a non-mode converting Bragg grating, according to an example embodiment.
Figure 15C:
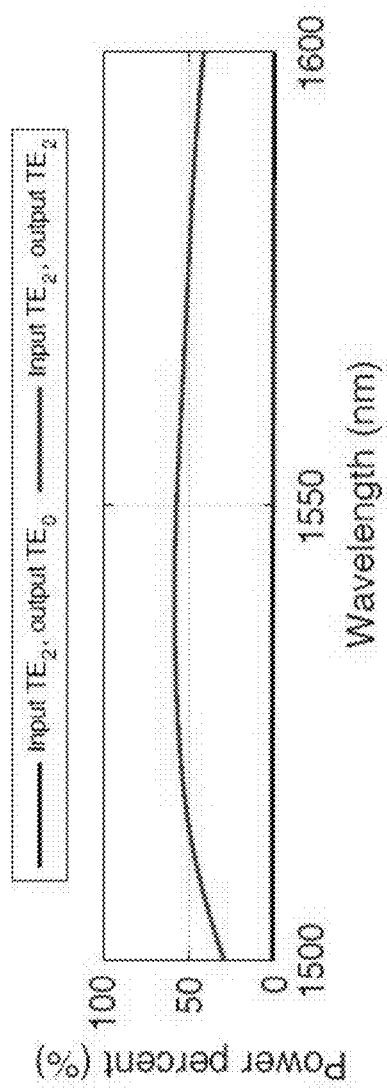
FIG. 15C illustrates the reflection curves for a non-mode converting Bragg grating, according to an example embodiment.
Figure 15C:
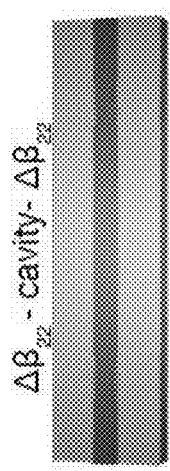

FIG. 15A illustrates the reflection curves for a mode-converting Bragg grating. The reflection curves of the Bragg gratings used in the resonator shown in the left panel can be reported under different input and output conditions. FIG. 15B illustrates the reflection curves for a non-mode converting Bragg grating. The reflection curves of the Bragg gratings used in the resonator shown in the left panel can be reported under different input and output conditions. FIG. 15C illustrates the reflection curves for a non-mode converting Bragg grating. The reflection curves of the Bragg gratings used in the resonator shown in the left panel can be reported under different input and output conditions. FIGS. 15A-15C illustrate the simulated mode conversion efficiency of the Bragg gratings used in the cascaded-mode resonator, in comparison with two test resonators which do not employ mode conversion but instead use (e.g., non-mode converting) Bragg mirrors that either reflect $TE_0$ into $TE_0$ or $TE_2$ into $TE_2$.

The cascaded-mode resonator 100 can be used in an inline device for a telecommunication system. The cascaded-mode resonator 100 can be used for a fiber. The cascaded-mode resonator 100 can be used to send different modes with different spatial profiles with the overall device performing the same function. A device including the cascaded-mode resonators can allow for the application of the same spectral function to different spatial modes.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A device, comprising:
   a first mode converter and a second mode converter that define a region between the first mode converter and the second mode converter, the region configured to contain a plurality of orthogonal modes of a wave;
   wherein the wave, when sent from outside the region and when propagating from the first mode converter towards the second mode converter, comprises a first mode of the plurality of orthogonal modes;
   wherein the second mode converter is configured to convert the wave from the first mode of the plurality of orthogonal modes, to a second mode of the plurality of orthogonal modes that is different from the first mode;
   wherein the first mode converter is configured to convert the wave to the first mode of the plurality of orthogonal modes;
   wherein the wave is a first wave comprising a first spectrum;
   wherein a second wave, when propagating from the first mode converter towards the second mode converter, comprises a second spectrum; and
   wherein the first spectrum and the second spectrum are the same.

2. The device of claim 1, wherein the first mode converter is configured to convert the wave from an $N^{th}$ mode of the plurality of orthogonal modes, to the first mode of the plurality of orthogonal modes, where N is an integer value that is equal to or larger than 2.

3. The device of claim 1, wherein:
   the first mode converter is configured to convert the wave from the second mode of the plurality of orthogonal modes to a third mode of the plurality of orthogonal modes;
   the second mode converter is configured to convert the wave from the third mode of the plurality of orthogonal modes to a fourth mode of the plurality of orthogonal modes; and
   the first mode converter is configured to convert the wave from the fourth mode of the plurality of orthogonal modes to the first mode of the plurality of orthogonal modes.

4. The device of claim 1, wherein:
   the first mode converter is configured to convert the wave from the second mode of the plurality of orthogonal modes to a third mode of the plurality of orthogonal modes;

the second mode converter is configured to reflect the wave with the third mode of the plurality of orthogonal modes towards the first mode converter;

the first mode converter is configured to convert the wave from the third mode of the plurality of orthogonal modes to the second mode of the plurality of orthogonal modes;

the second mode converter is configured to convert the wave from the second mode of the plurality of orthogonal modes to the first mode of the plurality of orthogonal modes; and the first mode converter is configured to reflect the wave with the first mode of the plurality of orthogonal modes towards the second mode converter.

5. The device of claim 1, wherein:

each of the plurality of orthogonal modes is defined by at least one of a polarization, a frequency, an amplitude, or a phase profile; or the first mode converter and the second mode converter are arranged in a linear geometry.

6. The device of claim 1, further comprising:

a first free-space input channel coupled with the first mode converter; and a second free-space input channel coupled with the second mode converter.

7. The device of claim 1, wherein:

the plurality of orthogonal modes contained in the region define an optical path of the wave; or the first mode converter comprises a first Bragg reflector and the second mode converter comprises a second Bragg reflector.

8. The device of claim 1, wherein:

the first mode of the plurality of orthogonal modes comprises a first propagation constant; and the second mode of the plurality of orthogonal modes comprises a second propagation constant, the second propagation constant different from the first propagation constant.

9. A device, comprising:

a mirror and a mode converter that define a region between the mirror and the mode converter, the region configured to contain a plurality of orthogonal modes of a wave;

wherein the wave, when sent from outside the region and when propagating from the mirror towards the mode converter, comprises a first mode of the plurality of orthogonal modes;

wherein the mode converter is configured to convert the wave from the first mode of the plurality of orthogonal modes, to a second mode of the plurality of orthogonal modes that is different from the first mode;

wherein the mirror is configured to reflect the wave with the second mode of the plurality of orthogonal modes towards the mode converter;

wherein the mode converter is configured to convert the wave from the second mode of the plurality of orthogonal modes to the first mode of the plurality of orthogonal modes; and wherein the mirror is configured to reflect the wave with the first mode of the plurality of orthogonal modes towards the mode converter.

10. The device of claim 9, wherein each of the plurality of orthogonal modes is defined by at least one of a polarization, a frequency, an amplitude, or a phase profile.

11. The device of claim 9, wherein:

the wave is a first wave, the first wave comprising a first spectrum;

a second wave, when propagating from the mirror towards the mode converter, comprises, a second spectrum; and the first spectrum and the second spectrum are the same.

12. The device of claim 9, further comprising:

a first free-space input channel coupled with the mirror; and a second free-space input channel coupled with the mode converter.

13. The device of claim 9, wherein the mirror and the mode converter are arranged in a linear geometry.

14. The device of claim 9, wherein the mirror and the mode converter are arranged in a ring geometry.

15. The device of claim 9, wherein the plurality of orthogonal modes contained in the region define an optical path of the wave.

16. The device of claim 9, wherein:

the first mode of the plurality of orthogonal modes comprises a first propagation constant; and the second mode of the plurality of orthogonal modes comprises a second propagation constant, the second propagation constant different from the first propagation constant.

17. The device of claim 9, wherein the mode converter comprises a Bragg reflector.

18. A device, comprising:

a first mode converter and a second mode converter that define a region between the first mode converter and the second mode converter, the region configured to contain a plurality of orthogonal modes of a wave;

a first free-space input channel coupled with the first mode converter; and a second free-space input channel coupled with the second mode converter;

wherein the wave, when sent from outside the region and when propagating from the first mode converter towards the second mode converter, comprises a first mode of the plurality of orthogonal modes;

wherein the second mode converter is configured to convert the wave from the first mode of the plurality of orthogonal modes, to a second mode of the plurality of orthogonal modes that is different from the first mode; and wherein the first mode converter is configured to convert the wave to the first mode of the plurality of orthogonal modes.

19. The device of claim 18, wherein:

each of the plurality of orthogonal modes is defined by at least one of a polarization, a frequency, an amplitude, or a phase profile; or the first mode converter and the second mode converter are arranged in a linear geometry.

20. The device of claim 18, wherein:

the plurality of orthogonal modes contained in the region define an optical path of the wave; or the first mode converter comprises a first Bragg reflector and the second mode converter comprises a second Bragg reflector.

\* \* \* \* \*